United States Patent
Carceller González et al.

(10) Patent No.: US 12,522,598 B2
(45) Date of Patent: Jan. 13, 2026

(54) 3-(2-(HETEROARYL)-PYRIDIN-4-YL)-5-(TRIFLUOROMETHYL)-1,2,4-OXADIAZOLE DERIVATIVES AS HDAC6 INHIBITORS

(71) Applicant: ORYZON GENOMICS, S.A., Madrid (ES)

(72) Inventors: Elena Carceller González, Sant Cugat del Vallès (ES); Alberto Ortega Muñoz, Vilassar de Dalt (ES); Jorge Salas Solana, Granollers (ES)

(*) Notice: Subject to any disclaimer, the term of this patent is extended or adjusted under 35 U.S.C. 154(b) by 869 days.

(21) Appl. No.: 17/596,048

(22) PCT Filed: Jun. 5, 2020

(86) PCT No.: PCT/EP2020/065658
§ 371 (c)(1),
(2) Date: Dec. 2, 2021

(87) PCT Pub. No.: WO2020/245381
PCT Pub. Date: Dec. 10, 2020

(65) Prior Publication Data
US 2022/0298156 A1    Sep. 22, 2022

(30) Foreign Application Priority Data

Jun. 6, 2019 (EP) .................... 19382475
Dec. 31, 2019 (EP) .................... 19383221

(51) Int. Cl.
*C07D 471/04* (2006.01)

(52) U.S. Cl.
CPC ................. *C07D 471/04* (2013.01)

(58) Field of Classification Search
CPC ......... C07D 471/04; A61P 29/00; A61P 35/00
See application file for complete search history.

(56) References Cited

U.S. PATENT DOCUMENTS

| | | |
|---|---|---|
| 10,081,624 B2 | 9/2018 | Kaieda et al. |
| 10,357,484 B2 | 7/2019 | Kaieda et al. |
| 10,406,146 B2 | 9/2019 | Kaieda et al. |
| 2010/0136024 A1 | 6/2010 | Bartels |
| 2020/0339569 A1 | 10/2020 | Carceller González et al. |
| 2023/0026909 A1 | 1/2023 | Carceller González et al. |

FOREIGN PATENT DOCUMENTS

| | | |
|---|---|---|
| BR | 112014012815 | 6/2017 |
| CN | 103998446 | 8/2014 |
| EA | 201390711 | 3/2014 |
| EP | 1870401 | 12/2007 |
| JP | 2014/533721 | 12/2014 |
| WO | WO2006/109817 | 10/2006 |
| WO | WO2012/068109 | 5/2012 |
| WO | WO2013/066839 | 5/2013 |
| WO | WO2013/080120 | 6/2013 |
| WO | WO2016/031815 | 3/2016 |
| WO | WO2017/014170 | 1/2017 |
| WO | WO2017/014321 | 1/2017 |
| WO | WO2017/033946 | 3/2017 |
| WO | WO2017/161033 | 9/2017 |
| WO | WO2017/222950 | 12/2017 |
| WO | WO2017/222951 | 12/2017 |
| WO | WO2017/222952 | 12/2017 |
| WO | WO2018/118781 | 6/2018 |
| WO | WO2019/110663 | 6/2019 |
| WO | WO-2019110663 A1 * | 6/2019 ........... C07D 471/04 |

OTHER PUBLICATIONS

Academic.ru, official terminology, "pharmaceutical composition", captured in the Internet Archive (Wayback Machine) on Dec. 4, 2013 (https://web.archive.org/web/20131204144425/https://official.academic.ru/28407/Фармацевтическая_композиция).
Belikov, V.G.: "Pharmaceutical Chemistry", Chapter 2.6 "The relationship between the chemical structure, the properties of substances and their effect on the body", Moscow, MEDpress-inform, 2007, p. 27-29.
Berge, S.M et al.: "Pharmaceutical Salts", *J Pharm Sci*, 1977, 66(1), 1-19, doi:10.1002/jps.2600660104.
Budchanov, Y.I.: "Transplantation Immunology", Manual for Students, 2012, p. 18.
Wikipedia, entry on "Autoimmune diseases" (Russian language version), captured in the Internet Archive (Wayback Machine) on Feb. 22, 2006 (https://web.archive.org/web/20060222180704/https://ru.wikipedia.org/wiki/Аутоиммунные заболев_ания).
Wikipedia, entry on "Cardiovascular diseases" (Russian language version), captured in the Internet Archive (Wayback Machine) on Nov. 12, 2011 (https://web.archive.org/web/20111112151547/https://ru.wikipedia.org/wiki/-Сердечно-сосудистые_заболевания).
Wikipedia, entry on "Category: Diseases of the central nervous system" (Russian language version), captured in the Internet Archive (Wayback Machine) on Sep. 13, 2006 (https://web.archive.org/web/20060913000000/https://ru.wikipedia.org/wiki/Категория Заболевания_центральной_нервной_системы).
Wikipedia, entry on "Ciliopathies" (Russian language version), captured in the Internet Archive (Wayback Machine) on Oct. 19, 2015 (https://web.archive.org/web/20151019031428/https://ru.wikipedia.org/wiki/Цилиопатии).
Wikipedia, entry on "Infectious diseases" (Russian language version), captured in the Internet Archive (Wayback Machine) on Jun. 21, 2006 (https://web.archive.org/web/20060621100102/https://ru.wikipedia.org/wiki/Инфекционные_заболев ания).
Wikipedia, entry on "Malignant tumor" (Russian language version), captured in the Internet Archive (Wayback Machine) on Jan. 15, 2006 (https://web.archive.org/web/20060115150816/https://ru.wikipedia.org/wiki/Злокачественная_опухоль).

(Continued)

*Primary Examiner* — Adam C Milligan
*Assistant Examiner* — Ernesto Valle, Jr.
(74) *Attorney, Agent, or Firm* — Finnegan, Henderson, Farabow, Garrett & Dunner, LLP

(57) ABSTRACT

The invention relates to compounds as described herein, useful as histone deacetylase 6 (HDAC6) inhibitors. The invention also relates to pharmaceutical compositions comprising these compounds and to their use in therapy.

36 Claims, No Drawings

(56) References Cited

OTHER PUBLICATIONS

Wikipedia, entry on "Mental disorder" (Russian language version), captured in the Internet Archive (Wayback Machine) on Sep. 13, 2006 (https://web.archive.org/web/20060913000000/https://ru.wikipedia.org/wiki/Психическое_расстройство ).
International Search Report of International Application No. PCT/EP2020/065658.
Written Opinion of the International Searching Authority of International Application No. PCT/EP2020/065658.

\* cited by examiner

3-(2-(HETEROARYL)-PYRIDIN-4-YL)-5-(TRIFLUOROMETHYL)-1,2,4-OXADIAZOLE DERIVATIVES AS HDAC6 INHIBITORS

This application is a national stage filing under 35 U.S.C. § 371 of International Application No. PCT/EP2020/065658, filed on Jun. 5, 2020, which claims benefit of European Patent Application Nos. 19382475.2, filed on Jun. 6, 2019, and 19383221.9, filed on Dec. 31, 2019, all of which are incorporated herein by reference.

TECHNICAL FIELD

The invention relates to 3-(2-(heteroaryl)-pyridin-4-yl)-5-(trifluoromethyl)-1,2,4-oxadiazole derivatives useful as histone deacetylase 6 inhibitors. The invention also relates to pharmaceutical compositions comprising these compounds and to their use in therapy.

BACKGROUND

Histone deacetylases (HDACs) are part of a large family of enzymes that catalyze the removal of acetyl group from histones and non-histone proteins. HDACs have crucial roles in numerous biological processes, largely through their repressive influence on transcription. In humans, there are four classes of HDACs which include a total of 18 proteins: class I HDACs are HDAC1, HDAC2, HDAC3 and HDAC8; class II HDACs are HDAC4, HDAC5, HDAC6, HDAC7, HDAC9 and HDAC10; class III HDACs are Sir2-like proteins SIRT1, SIRT2, SIRT3, SIRT4, SIRT5, SIRT6 and SIRT7; and class IV HDACs, which is HDAC11. The class II enzymes are further divided into two subclasses, class IIa (HDAC4, HDAC5, HDAC7 and HDAC9) and class IIb (HDAC6 and HDAC10).

Histone deacetylase 6 (HDAC6) catalyzes primarily the deacetylation of non-histone substrates such as alpha-tubulin, heat shock protein (Hsp)90 and cortactin.

HDAC6 activity has been reported to be involved in several pathological conditions, including cancer, neurological, ciliopathic, cardiovascular, infectious and immune and inflammatory diseases, as discussed in more detail below. HDAC6 inhibitors have thus emerged as an attractive therapeutic approach to treat a broad spectrum of diseases. There remains a significant need for the provision of HDAC6 inhibitors, particularly compounds that are potent and/or selective inhibitors of HDAC6 and exhibit suitable properties for drug development. The present invention addresses these and other needs.

SUMMARY OF THE INVENTION

Provided herein are compounds and salts thereof which are inhibitors of HDACs, particularly HDAC6, and methods of using these compounds to treat diseases associated with HDAC6, including cancer, autoimmune or inflammatory diseases, transplant rejection, ciliopathies, nervous system diseases, infectious diseases, cardiovascular diseases, muscle atrophy and cachexia.

Thus, the present invention provides a compound selected from the group consisting of:
(1-methyl-5-(4-(5-(trifluoromethyl)-1,2,4-oxadiazol-3-yl) pyridin-2-yl)-1H-pyrrolo[2,3-c]pyridin-2-yl)(morpholino)methanone,
N-(3-(dimethylamino)propyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide,
N-(2-hydroxyethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide,
N,1-dimethyl-N-((1-methylpiperidin-4-yl)methyl)-5-(4-(5-(trifluoromethyl)-1,2,4-oxadiazol-3-yl)pyridin-2-yl)-1H-pyrrolo[2,3-c]pyridine-2-carboxamide,
N,N-bis(2-hydroxyethyl)-1-methyl-5-(4-(5-(trifluoromethyl)-1,2,4-oxadiazol-3-yl)pyridin-2-yl)-1H-pyrrolo[2,3-c]pyridine-2-carboxamide,
N-(cyclopropylmethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide,
N-(2-methoxyethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide,
(1-methyl-5-(4-(5-(trifluoromethyl)-1,2,4-oxadiazol-3-yl) pyridin-2-yl)-1H-pyrrolo[2,3-c]pyridin-2-yl)(piperazin-1-yl)methanone,
N-ethyl-N,1-dimethyl-5-(4-(5-(trifluoromethyl)-1,2,4-oxadiazol-3-yl)pyridin-2-yl)-1H-pyrrolo[2,3-c]pyridine-2-carboxamide,
N,N-bis(2-methoxyethyl)-1-methyl-5-(4-(5-(trifluoromethyl)-1,2,4-oxadiazol-3-yl)pyridin-2-yl)-1H-pyrrolo[2,3-c]pyridine-2-carboxamide,
(S)-(1-methyl-5-(4-(5-(trifluoromethyl)-1,2,4-oxadiazol-3-yl)pyridin-2-yl)-1H-pyrrolo[2,3-c]pyridin-2-yl)(3-methylmorpholino)methanone,
(3-hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone,
3-(2-(1-(3-methoxypropyl)-1H-pyrazolo[4,3-b]pyridin-3-yl)pyridin-4-yl)-5-(trifluoromethyl)-1,2,4-oxadiazole,
3-(2-(1-((tetrahydro-2H-pyran-4-yl)methyl)-1H-pyrazolo[4,3-b]pyridin-3-yl)pyridin-4-yl)-5-(trifluoromethyl)-1,2,4-oxadiazole,
3-(2-(7-chloro-1-(2-methoxyethyl)-1H-pyrazolo[4,3-b]pyridin-3-yl)pyridin-4-yl)-5-(trifluoromethyl)-1,2,4-oxadiazole, and
3-(2-(1-(2-methoxyethyl)-1H-pyrazolo[3,4-b]pyrazin-3-yl) pyridin-4-yl)-5-(trifluoromethyl)-1,2,4-oxadiazole; or a salt thereof.

The present invention further provides a pharmaceutical composition comprising a compound of the invention (i.e. a compound as recited above), or a pharmaceutically acceptable salt thereof, and a pharmaceutically acceptable carrier.

The present invention further provides a compound of the invention, or a pharmaceutically acceptable salt thereof, for use as a medicament.

The present invention further provides a compound of the invention, or a pharmaceutically acceptable salt thereof, or a pharmaceutical composition comprising said compound, or a pharmaceutically acceptable salt thereof, and a pharmaceutically acceptable carrier, for use in the treatment of a disease associated with HDAC6.

The present invention further provides the use of a compound of the invention, or a pharmaceutically acceptable salt thereof, for the manufacture of a medicament for the treatment of a disease associated with HDAC6.

The present invention further provides the use of a compound of the invention, or a pharmaceutically acceptable salt thereof, for treating a disease associated with HDAC6.

The present invention further provides a compound of the invention, or a pharmaceutically acceptable salt thereof, for use as a HDAC6 inhibitor.

The present invention further provides a method for treating a disease associated with HDAC6, comprising administering a therapeutically effective amount of a compound of the invention, or a pharmaceutically acceptable salt thereof, to a patient in need thereof.

The present invention further provides a method of inhibiting HDAC6 activity, comprising administering an amount of a compound of the invention, or a pharmaceutically acceptable salt thereof, sufficient to inhibit HDAC6 activity to a patient in need thereof.

The present invention further provides a compound of the invention, or a pharmaceutically acceptable salt thereof, or a pharmaceutical composition comprising said compound or a pharmaceutically acceptable salt thereof and a pharmaceutically acceptable carrier, for use in the treatment of a disease selected from cancer, an autoimmune or inflammatory disease, transplant rejection, a ciliopathy, a disease of the nervous system, a mental or behavioral disorder, an infectious disease, a cardiovascular disease, muscle atrophy and cachexia.

The present invention further provides the use of a compound of the invention, or a pharmaceutically acceptable salt thereof, for the manufacture of a medicament for the treatment of a disease selected from cancer, an autoimmune or inflammatory disease, transplant rejection, a ciliopathy, a disease of the nervous system, a mental or behavioral disorder, an infectious disease, a cardiovascular disease, muscle atrophy and cachexia.

The present invention further provides the use of a compound of the invention, or a pharmaceutically acceptable salt thereof, for treating a disease selected from cancer, an autoimmune or inflammatory disease, transplant rejection, a ciliopathy, a disease of the nervous system, a mental or behavioral disorder, an infectious disease, a cardiovascular disease, muscle atrophy and cachexia.

The present invention further provides a method for treating a disease selected from cancer, an autoimmune or inflammatory disease, transplant rejection, a ciliopathy, a disease of the nervous system, a mental or behavioral disorder, an infectious disease, a cardiovascular disease, muscle atrophy and cachexia, comprising administering a therapeutically effective amount of a compound of the invention, or a pharmaceutically acceptable salt thereof, to a patient in need thereof.

DETAILED DESCRIPTION OF THE INVENTION

The present invention provides a compound selected from the group consisting of:
(1-methyl-5-(4-(5-(trifluoromethyl)-1,2,4-oxadiazol-3-yl)pyridin-2-yl)-1H-pyrrolo[2,3-c]pyridin-2-yl)(morpholino)methanone,
N-(3-(dimethylamino)propyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide,
N-(2-hydroxyethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide,
N,1-dimethyl-N-((1-methylpiperidin-4-yl)methyl)-5-(4-(5-(trifluoromethyl)-1,2,4-oxadiazol-3-yl)pyridin-2-yl)-1H-pyrrolo[2,3-c]pyridine-2-carboxamide,
N,N-bis(2-hydroxyethyl)-1-methyl-5-(4-(5-(trifluoromethyl)-1,2,4-oxadiazol-3-yl)pyridin-2-yl)-1H-pyrrolo[2,3-c]pyridine-2-carboxamide,
N-(cyclopropylmethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide,
N-(2-methoxyethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide,
(1-methyl-5-(4-(5-(trifluoromethyl)-1,2,4-oxadiazol-3-yl)pyridin-2-yl)-1H-pyrrolo[2,3-c]pyridin-2-yl)(piperazin-1-yl)methanone,
N-ethyl-N,1-dimethyl-5-(4-(5-(trifluoromethyl)-1,2,4-oxadiazol-3-yl)pyridin-2-yl)-1H-pyrrolo[2,3-c]pyridine-2-carboxamide,
N,N-bis(2-methoxyethyl)-1-methyl-5-(4-(5-(trifluoromethyl)-1,2,4-oxadiazol-3-yl)pyridin-2-yl)-1H-pyrrolo[2,3-c]pyridine-2-carboxamide,
(S)-(1-methyl-5-(4-(5-(trifluoromethyl)-1,2,4-oxadiazol-3-yl)pyridin-2-yl)-1H-pyrrolo[2,3-c]pyridin-2-yl)(3-methylmorpholino)methanone,
(3-hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone,
3-(2-(1-(3-methoxypropyl)-1H-pyrazolo[4,3-b]pyridin-3-yl)pyridin-4-yl)-5-(trifluoromethyl)-1,2,4-oxadiazole,
3-(2-(1-((tetrahydro-2H-pyran-4-yl)methyl)-1H-pyrazolo[4,3-b]pyridin-3-yl)pyridin-4-yl)-5-(trifluoromethyl)-1,2,4-oxadiazole,
3-(2-(7-chloro-1-(2-methoxyethyl)-1H-pyrazolo[4,3-b]pyridin-3-yl)pyridin-4-yl)-5-(trifluoromethyl)-1,2,4-oxadiazole, and
3-(2-(1-(2-methoxyethyl)-1H-pyrazolo[3,4-b]pyrazin-3-yl)pyridin-4-yl)-5-(trifluoromethyl)-1,2,4-oxadiazole; or a salt thereof.

The chemical structures of the compounds of the invention are shown in Table 1, below:

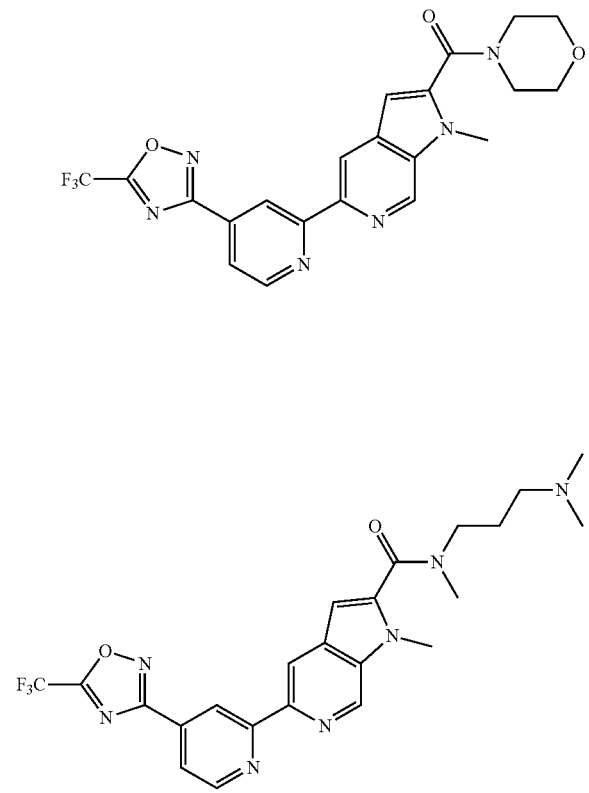

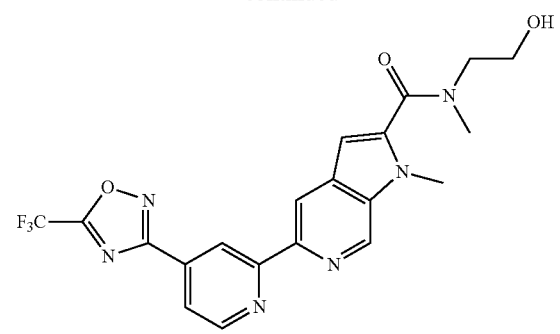
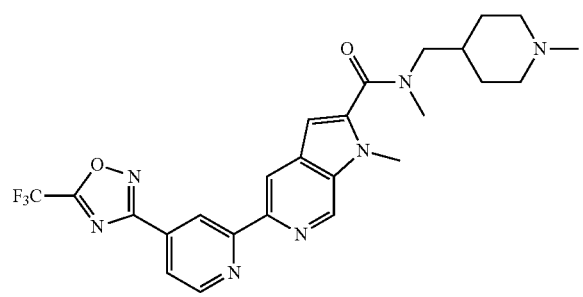
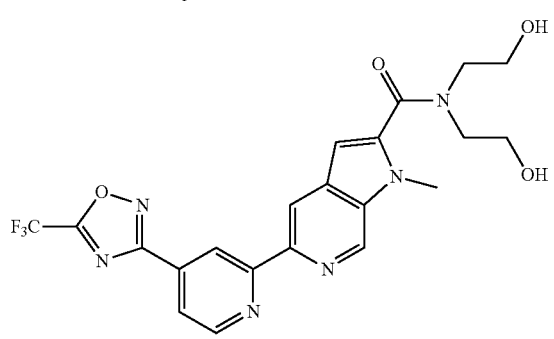
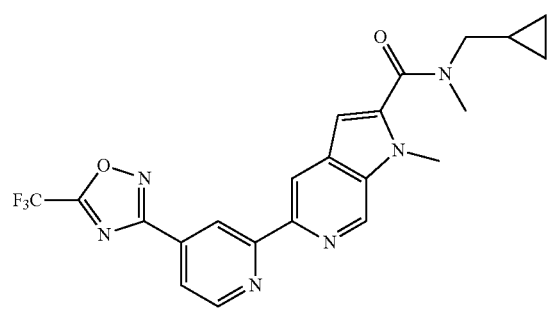
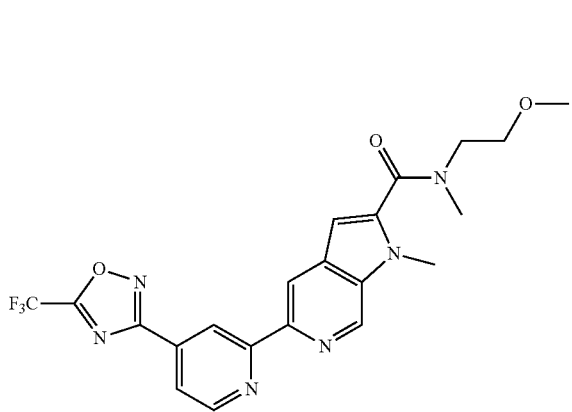
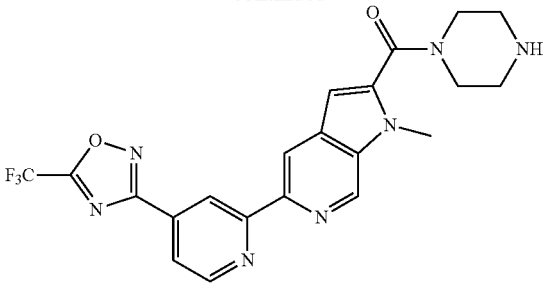
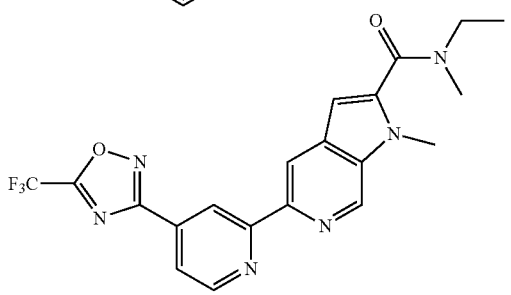
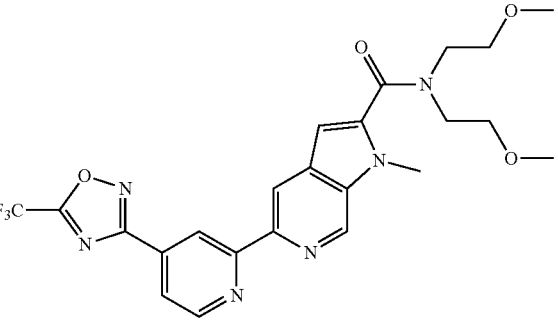
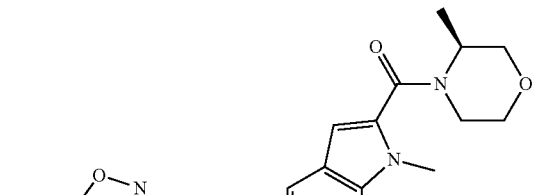
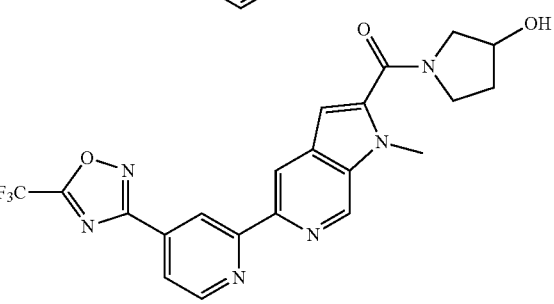
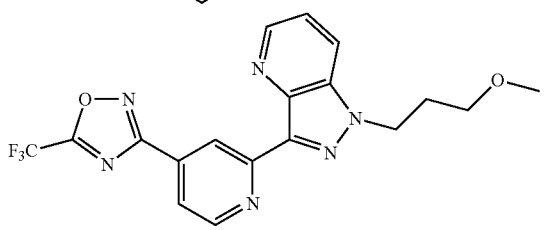

-continued

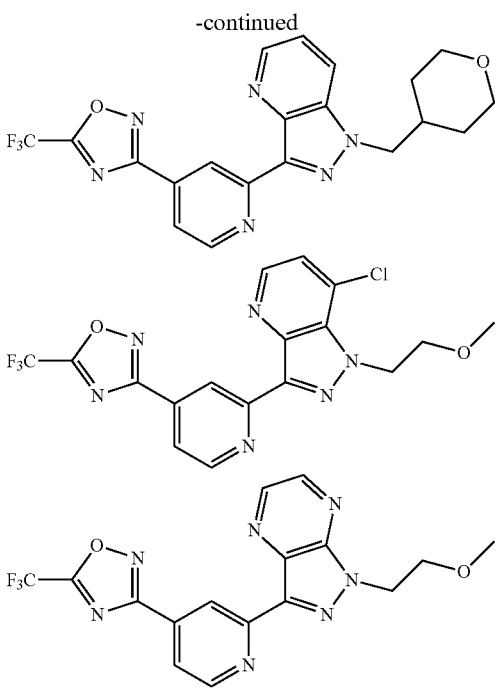

Embodiments of the present invention are outlined in the following paragraphs. Each of the embodiments described below can be combined with any other embodiment described herein that is not inconsistent with the embodiment with which it is combined.

Furthermore, each of the embodiments described herein envisions within its scope the salts (for example pharmaceutically acceptable salts) of the compounds described herein. Accordingly, the phrase "or a salt thereof" (including also "or a pharmaceutically acceptable salt thereof") is implicit in the description of all compounds described herein. The invention also specifically relates to all compounds described herein in non-salt form.

In certain embodiments, the invention provides a compound selected from the group consisting of:
(1-methyl-5-(4-(5-(trifluoromethyl)-1,2,4-oxadiazol-3-yl)pyridin-2-yl)-1H-pyrrolo[2,3-c]pyridin-2-yl)(morpholino)methanone,
N-(3-(dimethylamino)propyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide,
N-(2-hydroxyethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide,
N,1-dimethyl-N-((1-methylpiperidin-4-yl)methyl)-5-(4-(5-(trifluoromethyl)-1,2,4-oxadiazol-3-yl)pyridin-2-yl)-1H-pyrrolo[2,3-c]pyridine-2-carboxamide,
N,N-bis(2-hydroxyethyl)-1-methyl-5-(4-(5-(trifluoromethyl)-1,2,4-oxadiazol-3-yl)pyridin-2-yl)-1H-pyrrolo[2,3-c]pyridine-2-carboxamide,
N-(cyclopropylmethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide,
N-(2-methoxyethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide,
(1-methyl-5-(4-(5-(trifluoromethyl)-1,2,4-oxadiazol-3-yl)pyridin-2-yl)-1H-pyrrolo[2,3-c]pyridin-2-yl)(piperazin-1-yl)methanone,
N-ethyl-N,1-dimethyl-5-(4-(5-(trifluoromethyl)-1,2,4-oxadiazol-3-yl)pyridin-2-yl)-1H-pyrrolo[2,3-c]pyridine-2-carboxamide,
N,N-bis(2-methoxyethyl)-1-methyl-5-(4-(5-(trifluoromethyl)-1,2,4-oxadiazol-3-yl)pyridin-2-yl)-1H-pyrrolo[2,3-c]pyridine-2-carboxamide,
(S)-(1-methyl-5-(4-(5-(trifluoromethyl)-1,2,4-oxadiazol-3-yl)pyridin-2-yl)-1H-pyrrolo[2,3-c]pyridin-2-yl)(3-methylmorpholino)methanone, and
(3-hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone; or a salt thereof.

In certain embodiments, the invention provides a compound selected from the group consisting of:
3-(2-(1-(3-methoxypropyl)-1H-pyrazolo[4,3-b]pyridin-3-yl)pyridin-4-yl)-5-(trifluoromethyl)-1,2,4-oxadiazole,
3-(2-(1-((tetrahydro-2H-pyran-4-yl)methyl)-1H-pyrazolo[4,3-b]pyridin-3-yl)pyridin-4-yl)-5-(trifluoromethyl)-1,2,4-oxadiazole,
3-(2-(7-chloro-1-(2-methoxyethyl)-1H-pyrazolo[4,3-b]pyridin-3-yl)pyridin-4-yl)-5-(trifluoromethyl)-1,2,4-oxadiazole, and
3-(2-(1-(2-methoxyethyl)-1H-pyrazolo[3,4-b]pyrazin-3-yl)pyridin-4-yl)-5-(trifluoromethyl)-1,2,4-oxadiazole; or a salt thereof.

In certain embodiments, the invention provides a compound which is (1-methyl-5-(4-(5-(trifluoromethyl)-1,2,4-oxadiazol-3-yl)pyridin-2-yl)-1H-pyrrolo[2,3-c]pyridin-2-yl)(morpholino)methanone, or a salt thereof.

In certain embodiments, the invention provides a compound which is N-(3-(dimethylamino)propyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide, or a salt thereof.

In certain embodiments, the invention provides a compound which is N-(2-hydroxyethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide, or a salt thereof.

In certain embodiments, the invention provides a compound which is N,1-dimethyl-N-((1-methylpiperidin-4-yl)methyl)-5-(4-(5-(trifluoromethyl)-1,2,4-oxadiazol-3-yl)pyridin-2-yl)-1H-pyrrolo[2,3-c]pyridine-2-carboxamide, or a salt thereof.

In certain embodiments, the invention provides a compound which is N,N-bis(2-hydroxyethyl)-1-methyl-5-(4-(5-(trifluoromethyl)-1,2,4-oxadiazol-3-yl)pyridin-2-yl)-1H-pyrrolo[2,3-c]pyridine-2-carboxamide, or a salt thereof.

In certain embodiments, the invention provides a compound which is N-(cyclopropylmethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide, or a salt thereof.

In certain embodiments, the invention provides a compound which is N-(2-methoxyethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide, or a salt thereof.

In certain embodiments, the invention provides a compound which is (1-methyl-5-(4-(5-(trifluoromethyl)-1,2,4-oxadiazol-3-yl)pyridin-2-yl)-1H-pyrrolo[2,3-c]pyridin-2-yl)(piperazin-1-yl)methanone, or a salt thereof.

In certain embodiments, the invention provides a compound which is N-ethyl-N,1-dimethyl-5-(4-(5-(trifluoromethyl)-1,2,4-oxadiazol-3-yl)pyridin-2-yl)-1H-pyrrolo[2,3-c]pyridine-2-carboxamide, or a salt thereof.

In certain embodiments, the invention provides a compound which is N,N-bis(2-methoxyethyl)-1-methyl-5-(4-(5-(trifluoromethyl)-1,2,4-oxadiazol-3-yl)pyridin-2-yl)-1H-pyrrolo[2,3-c]pyridine-2-carboxamide, or a salt thereof.

In certain embodiments, the invention provides a compound which is (S)-(1-methyl-5-(4-(5-(trifluoromethyl)-1,2,4-oxadiazol-3-yl)pyridin-2-yl)-1H-pyrrolo[2,3-c]pyridin-2-yl)(3-methylmorpholino)methanone, or a salt thereof.

In certain embodiments, the invention provides a compound which is (3-hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone, or a salt thereof. The invention also relates to each enantiomer of this compound, i.e. (R)-(3-hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone and (S)-(3-hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone, as illustrated in the following:

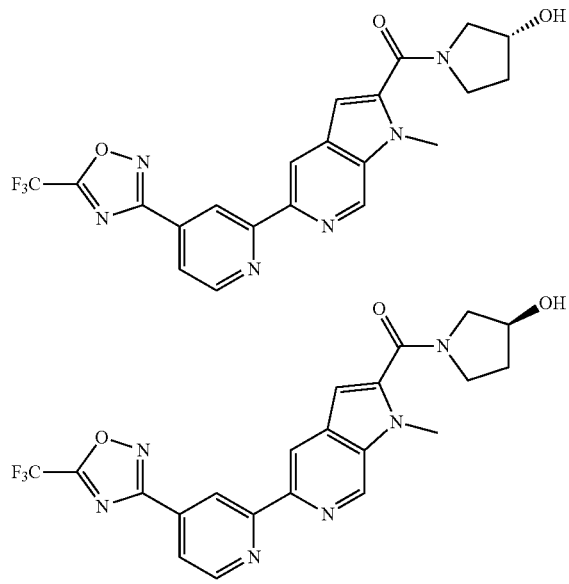

Thus, in certain embodiments, the invention provides a compound which is (R)-(3-hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone, or a salt thereof. In certain embodiments, the invention provides a compound which is (S)-(3-hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone, or a salt thereof.

In certain embodiments, the invention provides a compound which is 3-(2-(1-(3-methoxypropyl)-1H-pyrazolo[4,3-b]pyridin-3-yl)pyridin-4-yl)-5-(trifluoromethyl)-1,2,4-oxadiazole, or a salt thereof.

In certain embodiments, the invention provides a compound which is 3-(2-(1-((tetrahydro-2H-pyran-4-yl)methyl)-1H-pyrazolo[4,3-b]pyridin-3-yl)pyridin-4-yl)-5-(trifluoromethyl)-1,2,4-oxadiazole, or a salt thereof.

In certain embodiments, the invention provides a compound which is 3-(2-(7-chloro-1-(2-methoxyethyl)-1H-pyrazolo[4,3-b]pyridin-3-yl)pyridin-4-yl)-5-(trifluoromethyl)-1,2,4-oxadiazole, or a salt thereof.

In certain embodiments, the invention provides a compound which is 3-(2-(1-(2-methoxyethyl)-1H-pyrazolo[3,4-b]pyrazin-3-yl)pyridin-4-yl)-5-(trifluoromethyl)-1,2,4-oxadiazole, or a salt thereof.

A particularly preferred compound of the invention is (1-methyl-5-(4-(5-(trifluoromethyl)-1,2,4-oxadiazol-3-yl)pyridin-2-yl)-1H-pyrrolo[2,3-c]pyridin-2-yl)(morpholino)methanone, or a salt thereof. In certain embodiments, the compound is provided as the free base (i.e. in non-salt form). In certain embodiments, the compound is provided as a salt, preferably a pharmaceutically acceptable salt. In some embodiments, the salt is a hydrochloride salt. In some embodiments, the salt is a mesylate salt.

Another particularly preferred compound of the invention is (3-hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone, or a salt thereof. In certain embodiments, the compound is provided as (S)-(3-hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone, or a salt thereof. In certain embodiments, the compound is provided as (R)-(3-hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone, or a salt thereof. In certain embodiments, the compound is provided as the free base (i.e. in non-salt form). In certain embodiments, the compound is provided as a salt, preferably a pharmaceutically acceptable salt. In some embodiments, the salt is a hydrochloride salt. In some embodiments, the salt is a (+)-camphorsulfonate salt.

Another particularly preferred compound of the invention is 3-(2-(1-(3-methoxypropyl)-1H-pyrazolo[4,3-b]pyridin-3-yl)pyridin-4-yl)-5-(trifluoromethyl)-1,2,4-oxadiazole, or a salt thereof. In certain embodiments, the compound is provided as the free base (i.e. in non-salt form).

Certain compounds of the invention contain one asymmetric center and may thus give rise to stereoisomers. All stereoisomers, such as enantiomers and mixtures thereof, are intended unless otherwise indicated. Thus, for example, in the case of the compound (3-hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone which contains one asymmetric center, i.e. the ring carbon atom carrying the hydroxy group at position 3 of the pyrrolidine ring, the invention relates to each enantiomer, i.e. (R)-(3-hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone and (S)-(3-hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone, as well as mixtures thereof. Compounds of the present invention that contain asymmetrically substituted carbon atoms can be isolated in optically active form or racemic mixtures. Methods on how to prepare optically active forms from optically inactive starting materials are known in the art, and include for example by resolution of racemic mixtures or by stereoselective synthesis.

Compounds of the invention include unlabeled forms of the compounds of the invention as well as isotopically labeled forms thereof. Isotopically labeled forms of the compounds are compounds that differ only in the replacement of one or more atoms by a corresponding isotopically enriched atom. Examples of isotopes that can be incorporated into compounds of the invention include for example isotopes of hydrogen, carbon, nitrogen, oxygen, fluorine, chlorine, and iodine, such as $^2H$, $^3H$, $^{11}C$, $^{13}C$, $^{14}C$, $^{15}N$, $^{18}O$, $^{17}O$, $^{35}S$, $^{18}F$, $^{36}Cl$, and $^{125}I$. Such isotopically labelled compounds are useful for example as probes in biological assays, as analytical tools, or as therapeutic agents. In certain embodiments, the compounds of the invention are provided in unlabeled form.

"Polymorphs" or "crystal forms" refers to crystal structures in which a compound (or a salt or solvate thereof) can crystallize in different crystal packing arrangements, all of which have the same elemental composition. Different crystal forms usually have different X-ray diffraction patterns, infrared spectra, Raman spectra, melting points, differential scanning calorimetry (DSC) spectra, crystal shape, solubility and/or stability, among others. When compounds of the invention exist in different solid forms, all forms thereof, including amorphous forms and crystal forms, are intended to be included in the scope of the present invention.

The present invention also includes salts of the compounds of the invention. Preferably, said salts are pharmaceutically acceptable salts. As used herein, a "pharmaceutically acceptable salt" is intended to mean a salt that retains the biological effectiveness and properties of the parent compound and that is not biologically or otherwise undesirable. Pharmaceutically acceptable salts include salts formed with inorganic or organic acids. Pharmaceutically acceptable salts are well known in the art. Exemplary pharmaceutically acceptable salts include those salts prepared by reaction of the compounds of the present invention with a mineral or organic acid, such as hydrochlorides, hydrobromides, sulfates, pyrosulfates, bisulfates, sulfites, bisulfites, phosphates, monohydrophosphates, dihydrophosphates, metaphosphates, pyrophosphates, chlorides, bromides, iodides, nitrates, acetates, haloacetates (e.g. trifluoroacetates), propionates, decanoates, caprylates, acrylates, formates, isobutyrates, caproates, heptanoates, propiolates, oxalates, malonates, succinates, suberates, sebacates, fumarates, maleates, butyne-1,4 dioates, hexyne-1,6-dioates, benzoates, chlorobenzoates, methylbenzoates, dinitrobenzoates, hydroxybenzoates, methoxybenzoates, phthalates, sulfonates, xylenesulfonates, phenylacetates, phenylpropionates, phenylbutyrates, citrates, lactates, gamma-hydroxybutyrates, glycollates, tartrates, methanesulfonates (mesylates), ethane-sulfonates, propane-sulfonates, benzenesulfonates, toluenesulfonates, trifluoromethansulfonates, naphthalene-1-sulfonates, naphthalene-2-sulfonates, camphorsulfonates (camsylates), mandelates, pyruvates, stearates, ascorbates, or salicylates. Accordingly, the present invention specifically relates to a salt, preferably a pharmaceutically acceptable salt (such as, e.g., any one of the above-mentioned salts), of each compound provided herein. The pharmaceutically acceptable salts of the present invention can be prepared from the parent compound by conventional chemical methods. For example, such salts can be prepared by reacting the free base form of these compounds with a suitable amount of the appropriate acid in a suitable solvent.

Additionally, compounds of the present invention, or salts thereof, may exist in hydrated or unhydrated (anhydrous) form or as solvates with other solvent molecules. "Solvate" as used herein means solvent addition forms that contain either stoichiometric or non-stoichiometric amounts of solvent. Some compounds have a tendency to trap a fixed molar ratio of solvent molecules in the crystalline solid state, thus forming a solvate. If the solvent is water, the solvate formed is a hydrate. Non-limiting examples of solvates include hydrates and solvates with alcohols (also named alcoholates) such as ethanol (ethanolates). When compounds of the invention (or salts thereof) exist as solvates, all solvates thereof are intended to be included in the scope of the present invention, particularly pharmaceutically acceptable solvates. As used herein a "pharmaceutically acceptable solvate" is a solvate formed with a pharmaceutically acceptable solvent. Pharmaceutically acceptable solvents are well known in the art and include solvents such as water and ethanol.

Compounds of the invention, including salts thereof, can be prepared using a number of synthetic routes, including the general synthetic routes described below and the methods disclosed in the examples, starting from commercially available starting materials, compounds known in the literature, or from readily available intermediates, by employing standard synthetic methods and procedures. Standard synthetic methods and procedures for the preparation of organic compounds and functional group transformations and manipulations are known in the art and can be found in standard textbooks such as Smith M. B., "*March's Advanced Organic Chemistry: Reactions, Mechanisms, and Structure*", 7th Edition, Wiley, 2013; Greene T W and Wuts P G M "*Greene's Protective Groups in Organic Synthesis*", 4th edition, Wiley, 2006).

The reaction schemes described below are only meant as illustrative of methods to obtain the compounds of the invention. Other routes known by the ordinary skilled artisan, as well as other reactants and intermediates, can also be used to arrive at the compounds of the invention.

In some of the processes described below it may be necessary or advisable to protect reactive or labile groups with conventional protecting groups. Both the nature of these protecting groups and the procedures for their introduction and removal are well known in the art (see for example Greene T W and Wuts P G M, cited supra). Whenever a protecting group is present, a subsequent deprotection step will be required, which can be performed under standard conditions well known in the art, such as those described in the above reference.

In general, the compounds of the invention can be obtained following the procedure shown in Scheme 1 below.

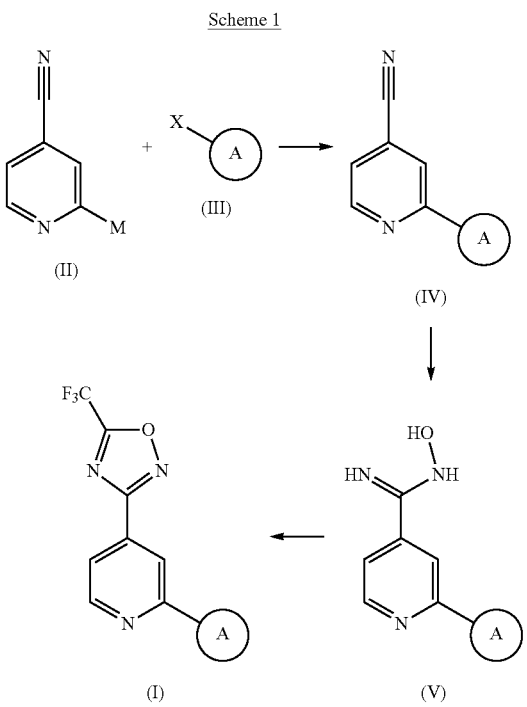

wherein in Scheme 1 the substituent "A" corresponds to the specific bicyclic heteroaryl group attached at position 2 of the pyridine ring in the compounds of the invention, as depicted in Table 1; a compound of formula (I) corresponds to a compound of the invention (i.e. a compound as depicted in Table 1 and/or in the claims); and M and X have the meaning defined below.

In a first step, a compound of Formula (IV) is obtained via a cross-coupling reaction of a organometallic species (II) with a halide (III). Typically this coupling is conducted using the Stille reaction where M is trialkylstannyl group and X is Cl, Br or I. The reaction can be performed using a suitable Pd/ligand combination such as $Pd(PPh_3)_4$, $Pd(PPh_3)Cl_2$ or $Pd(dppb)Cl_2$ in the presence of a suitable Cu salt such as CuI or CuO, in the presence or absence of CsF, in a suitable solvent such as tetrahydrofuran, dioxane or dimethylformamide. The temperature of the reaction can typically go from room temperature to 120° C. and the time of reaction typically from 1 h to 48 h. The organotin employed can be trimethylstannyl derivative. Alternatively, an intermolecular Stille Kelly reaction can also be used, in which both reagents (II) and (III) are halo derivatives (i.e. M and X are halo) and are treated with $(Bu_3Sn)_2$, $Et_4Ni$, and a Pd/ligand combination.

Compounds of the invention are then obtained in two steps from a cyano derivative of Formula (IV). In a first step, the cyano derivative of Formula (IV) is transformed into the N'-hydroxyimidamide of Formula (V) by reaction with hydroxylamine, which is then followed by condensation of (V) with trifluoroacetic anhydride to give a compound of the invention. Addition of hydroxylamine to cyano derivatives (IV) is carried out in a suitable solvent such as EtOH or MeOH, and in the presence of base in the case hydroxylamine chlorhydrate is used. The temperature of the reaction can typically go from room temperature to 60° C. and the time of reaction typically from 1 h to 48 h. The condensation of N'-hydroxyimidamides (V) with trifluoroacetic anhydride in a suitable solvent such as $CH_2Cl_2$ or THF gives the corresponding N'-trifluoroacetyloxyimidamide that in the same reaction medium or after the addition of trifluoroacetic acid yield the 1,2,4-oxadiazoles of the invention.

The compounds of Formula (II) and (III) are commercial or can be obtained following standard procedures well known to those skilled in the art of organic chemistry. Organometallic derivatives of Formula (II) can be obtained from a corresponding halo compound by transmetallation following standard procedures in the preparation of reagents for Stille couplings, well known to those skilled in the art of organic chemistry. For example, trimethyltin derivatives of formula (II) can be prepared by reaction of a corresponding bromo derivative with hexamethylditin and $Pd(PPh_3)_4$ in toluene at 110° C. for 16 h.

The salts of the compounds of the invention can be obtained during the final isolation and purification of the compounds of the invention or can be prepared by treating a compound of the invention with a sufficient amount of the desired acid to give the corresponding salt in a conventional manner.

Where the processes for the preparation of the compounds of the invention give rise to mixtures of stereoisomers, individual stereoisomers of a compound of the invention can be obtained for example by resolution, starting from a compound of the invention obtained as a mixture of stereoisomers, using well known methods such as formation of diastereomeric pairs by salt formation with an optically active acid followed by fractional crystallization and regeneration of the free base, or by chiral preparative chromatography. Alternatively, it is possible to obtain optically pure or enantiomerically enriched synthetic intermediates, which can then be used as such in subsequent steps, at various stages of the synthetic procedures described above, using any known method for chiral resolution. Alternatively, it is possible to obtain optically pure or enantiomerically enriched final compounds (or synthetic intermediates) by using chiral chromatography.

The compounds of the invention inhibit the activity of histone deacetylases. In particular, the compounds of the invention have been found to be potent inhibitors of HDAC6. The activity of the compounds of the invention as HDAC6 inhibitors can be determined using for example the in vitro assays described in the Examples section. In particular, Example 7 describes a method to determine HDAC6 inhibitory activity in vitro. The compounds of the invention have been found to be potent HDAC6 inhibitors using the assay described in Example 7. HDAC6 inhibitory activity can also be determined in cell assays, for example using assays measuring the levels of acetylation of a specific substrate of HDAC6, such as alpha-tubulin, in cells, such as the assay described in Example 8. Compounds of the invention have been shown to inhibit HDAC6 activity in cells, for example using the cell assay described in Example 8. Selectivity towards HDAC6 compared to other HDAC isoforms may be assayed using methods well known in the art, for example in vitro assays similar to the one described in Example 7 using the corresponding HDAC isoform of interest.

HDAC6 is a class IIb HDAC that can deacetylate substrates, such as tubulin, heat shock protein (Hsp)90 and cortactin. HDAC6 localizes in the cytosol and possesses two catalytic domains and a C-terminal zinc finger domain that can bind free ubiquitin as well mono- and polyubiquitinated proteins (Li et al, FEBS J. 2013 February; 280(3):775-93). The ubiquitin-binding domain in HDAC6 associates with several proteins involved in the control of the ubiquitin, proteasome system, aggresome formation and autophagy. Additionally, the ability of HDAC6 to deacetylate alpha-tubulin affects microtubule-mediated processes such as cell migration, immune synapse formation, viral infection, the degradation of misfolded proteins and of stress granule. HDAC6 has also been shown to deacetylate Hsp90 and modulate its chaperone activity, thus modulating various Hsp90-associated cell signaling pathways such as the control of stress-related response.

Many studies have reported the role of HDAC6 in cancer. For example, inhibition of HDAC6 was shown to reduce growth of multiple myeloma in preclinical models and to enhance the effect of proteasome inhibitors and thalidomide-based immunomodulatory drugs used as standards of care (Santo et al, Blood. 2012 Mar. 15; 119(11):2579-89; North et al, PLoS One. 2017 Mar. 6; 12(3):e0173507). Inhibition of HDAC6 was also shown to increase the effect of other standard of care drugs such as paclitaxel in ovarian, pancreatic and breast cancer cells (Huang et al, Oncotarget 2017 Jan. 10; 8(2):2694-2707). The antiproliferative activity of HDAC6 inhibitors has also been observed in prostate cancer and melanoma cells (Li et al, Eur J Med Chem. 2015 Jul. 15; 100:270-6; Seidel et al, Biochem Pharmacol. 2016 Jan. 1; 99:31-52). In addition, in vivo efficacy of HDAC6 inhibitors has been reported in colorectal, inflammatory breast cancer, leukemia, lymphoma and ARID1A mutant ovarian xenograft models (Yang et al, J Med Chem. 2016 Feb. 25; 59(4):1455-70; Putcha et al, Breast Cancer Res. 2015 Dec. 8; 17(1):149; Bitler et al, Nat Cell Biol. 2017 August; 19(8):962-973). Similarly, HDAC6 knock down reduces uterine leiomyoma and gastric cancer cell proliferation, while HDAC6 overexpression promotes proliferation and promotes drug-resistance of non-small cell lung cancer cells and glioblastoma cells (Wei et al, Reprod Sci. 2011 August; 18(8):755-62; Park et al, Cancer Lett. 2014 Nov. 1; 354(1):97-106; Wang et al, Oncol Rep. 2016 July; 36(1):589-97; Wang et al, Cancer Lett. 2016 Aug. 28; 379(1):134-42). Furthermore, HDAC6 inhibitors were shown to have anticancer activity by stimulating the immune-response against the tumors in models of melanoma and non-small cell lung cancer when used alone or in combination with immune-checkpoints inhibitors or epigenetic modulators (Knox et al, Abstract 4055, AACR Annual Meeting 2017; Apr. 1-5, 2017; Washington, DC; Woan et al, Mol Oncol. 2015 August; 9(7): 1447-1457; Tavares et al, ACS Med Chem Lett. 2017 Sep. 5; 8(10)1031-1036; Adeegbe et al, Cancer Discov. 2017 August; 7(8):852-867).

HDAC6 has also been widely reported to play a role in inflammatory and autoimmune diseases. Knock out mice for HDAC6 have an increased number of circulating regulatory T cells (Tregs), which are key to the maintenance of immune homeostasis. Likewise, HDAC6 specific inhibitors promote Treg suppressive activity in models of inflammatory bowel disease and graft versus host disease (de Zoeten et al, Mol Cell Biol. 2011 May; 31(10):2066-78). HDAC6 inhibitors were shown to have disease modifying activity in models of inflammation, rheumatoid arthritis and systemic lupus erythematosus (Vishwakarma et al, Int Immunopharmacol. 2013 May; 16(1):72-8; Regna et al, Clin Immunol. 2016 January; 162:58-73). Mice lacking HDAC6 display reduction of autophagy, which ameliorates chronic obstructive pulmonary disease (COPD)-associated cilia dysfunction (Lam et al, J Clin Invest. 2013 December; 123(12):5212-30).

HDAC6 inhibitors have also been reported to be effective to treat ciliopathies. Ciliopathies are genetic diseases associated with defects in ciliary structure or function, and include, among others, polycystic kidney disease, polycystic liver disease, Bardet-Biedl syndrome and retinal degeneration. In a model of polycystic kidney disease, HDAC6 inhibitors prevented cyst formation and improved renal function (Cebotaru et al, Kidney Int. 2016 July; 90(1):90-9). Similarly, in a model of polycystic liver disease, pharmacological inhibition of HDAC6 decreased proliferation of cystic cholangiocytes, and diminished liver cyst development and fibrosis (Gradilone et al, Am J Pathol. 2014 March; 184(3):600-8).

HDAC6 has also been shown to have an important role in diseases of the nervous system. In particular, HDAC6 inhibitors showed efficacy in models of peripheral neuropathies such as Charcot-Marie-Tooth disease and chemotherapy-induced peripheral neuropathy (Benoy et al, Neurotherapeutics. 2017 April; 14(2):417-428; Krukowski et al, Pain. 2017 June; 158(6):1126-1137). In addition, in neuronal culture derived from patients with amyotrophic lateral sclerosis, treatment with HDAC6 inhibitors rescued their defective phenotype (Guo et al, Nat Commun. 2017 Oct. 11; 8(1): 861).

HDAC6 inhibitors have also been reported to be effective to treat several other diseases of the nervous system. For example, reduction or inhibition of HDAC6 has been shown to rescue memory and improve cognition in mouse models of Alzheimer's disease (Govindarajan et al, EMBO Mol Med. 2013 January; 5(1):52-63). Loss or inhibition of HDAC6 suppresses neuritic tau accumulation, thus HDAC6 inhibition could be useful to treat not only Alzheimer's disease but also other human 4-repeat tauopathies such as corticobasal degeneration and progressive supranuclear palsy (Tseng et al, Cell Rep. 2017 Aug. 29; 20(9):2169-2183). Furthermore, in a model of Huntington's disease (HD), HDAC6 inhibition reduces the vulnerability of neurons to mutant huntingtin, thus suggesting a neuroprotective effect of HDAC6 inhibitors in HD (Guedes-Dias et al, Biochim Biophys Acta, 2015 November; 1852(11):2484-93).

HDAC6 has also been reported to play a role in mental and behavioural disorders such as depression. For example, HDAC6 inhibitors stimulated the mouse exploratory behaviors and had a positive effect in anxiolytic and social interaction tests (Jochems et al, Neuropsychopharmacology. 2014 January; 39(2):389-400).

Moreover, several publications have underlined the important role of HDAC6 in infectious diseases. The use of HDAC6 inhibitors has been shown to reduce the replication of viruses such as Japanese Encephalitis Virus (JEV), hepatitis C virus (HCV) and Rabies Virus (Lu et al, Int J Mol Sci. 2017 May 1; 18(5); Zan et al, Front Cell Infect Microbiol. 2017 Apr. 26; 7:146; Ai et al, J Med Chem. 2015 Jan. 22; 58(2):785-800). HDAC6 was also shown to facilitate cell entry of influenza A viruses and to control the viral lytic—latency switch of other viruses (Banerjee et al, Science 2014 Oct. 24; 346(6208):473-7). For example, HDAC6 was reported to be involved in the maintenance of HIV latency, thus inhibition of HDAC6 could promote the body clearance of the virus (Huo et al, J Biol Chem. 2011 Mar. 18; 286(11):9280-6). Furthermore, selective HDAC6 inhibitors improved survival and bacterial clearance in models of sepsis (Zhao et al, J Trauma Acute Care Surg. 2016 January; 80(1):34-40).

Several publications have also reported a role of HDAC6 in cardiovascular diseases. Knockout mice for HDAC6 display improved heart condition in mouse models of heart failure. Moreover, HDAC6 null mice are resistant to skeletal muscle wasting considered a life threatening complication in congestive heart failure (Demos-Davies et al, Am J Physiol Heart Circ Physiol. 2014 Jul. 15; 307(2):H252-8). Pharmacological inhibition of HDAC6 was shown to protect against atrial remodeling in connection to atrial fibrillation (Zhang et al, Circulation. 2014 Jan. 21; 129(3):346-58). HDAC6 activity was consistently increased in stressed myocardium, thus suggesting a role for HDAC6 inhibitors in myocardiopathies (Lemon et al, J Mol Cell Cardiol. 2011 July; 51(1):41-50). Selective inhibition of HDAC6 has also been reported to improve survival in a rodent model of hemorrhagic shock (Chang et al, J Trauma Acute Care Surg. 2015 December; 79(6):905-10). Furthermore, inhibition of HDAC6 improved established pulmonary artery hypertension in experimental models and exerts a neuroprotective effect in models of brain ischemia (Boucherat et al, Sci Rep. 2017 Jul. 3; 7(1):4546; Liesz et al, J Neurosci. 2013 Oct. 30; 33(44):17350-62).

The compounds of the invention are thus expected to be useful for treating diseases associated with HDACs, in particular HDAC6. Examples of diseases associated with HDAC6 to be treated with the compounds of the invention include, without limitation, the diseases listed in the preceding paragraphs as well as the diseases listed below:

Cancers, such as: lung cancer, colon cancer, breast cancer, prostate cancer, liver cancer, brain cancer and others CNS neoplasms, kidney cancer, ovarian cancer, stomach cancer, skin cancer, bone cancer, gastric cancer, pancreatic cancer, cardiac cancer, glioma, glioblastoma, esophageal cancer, hepatocellular carcinoma, bone and joint cancer, papillary renal carcinoma, head and neck squamous cell carcinoma, sarcomas, mesothelioma, leukemias, lymphomas, and myelomas;

Autoimmune or inflammatory diseases, such as: rheumatoid arthritis, osteoarthritis, rheumatoid spondylitis, psoriatic arthritis, infectious arthritis, progressive chronic arthritis, deforming arthritis, traumatic arthritis, gouty arthritis, Reiter's syndrome, polychondritis, acute synovitis and spondylitis, psoriasis, post ischemic perfusion injury, inflammatory bowel disease (e.g. ulcerative colitis or Crohn's disease), eczema, ischemia/reperfusion injury, glomerulonephritis, hemolytic anemia, aplastic anemia, idiopathic thrombocytopenia, neutropenia, chronic thyroiditis, Graves' disease, diabetes type I, scleroderma, diabetes, hepatitis, primary binary cirrhosis, systemic inflammatory response syndrome, postoperative or posttraumatic inflammation, myasthenia gravis, pemphigus, alcoholic liver disease, cystic fibrosis, multiple sclerosis (MS), Addison's disease, Castleman's disease, polyarteritis nodosa, systemic lupus erythematosus, atopic dermatitis, contact dermatitis, chronic renal insufficiency, Stevens-Johnson syndrome, idiopathic sprue, sarcoidosis, Guillain-Barre syndrome, uveitis, conjunctivitis, keratoconjunctivitis, otitis media, periodontal disease, pulmonary interstitial fibrosis, acute respiratory distress syndrome, asthma, bronchitis, rhinitis, sinusitis, pancreatitis, inflammatory bone disease, meningitis, cystitis, pharyngolaryngitis, pneumoconiosis, pulmonary insufficiency syndrome, pulmonary emphysema, chronic obstructive pulmonary disease (COPD), pulmonary fibrosis, silicosis, chronic inflammatory pulmonary disease, or peritoneal fibrosis;

Transplant rejection, including host versus graft disease, graft versus host disease and allograft rejection. Infectious diseases, including influenza, viral encephalitis, HIV, hepatitis of viral origin, pneumonia and sepsis. Ciliopathies, such as polycystic kidney disease, polycystic liver disease, Alstrom syndrome, Bardet-Biedl syndrome, retinal degeneration, Joubert syndrome, Meckel-Gruber syndrome, nephronophthisis, orofaciodigital syndrome 1, Senior-Loken syndrome, primary ciliary dyskinesia (Kartagener Syndrome), orasphyxiating thoracic dysplasia (Jeune), Marden-Walker syndrome, or isomerism;

Diseases of the nervous system, such as Wilson's disease, prion disease, Parkinson's disease, Huntington's disease, amyotrophic lateral sclerosis, amyloidosis, Alzheimer's disease, Alexander's disease, Pick's Disease, spinal muscular dystrophy, Lewy body dementia, chemotherapy-induced cognitive dysfunction, mitochondrial encephalomyopathies and gut dysmotility syndromes, motor neurogenesis disease (MND), ataxia syndromes including Friedreich's ataxia and spinocerebellar ataxia (SCA), spinal cord injury, olivopontocerebellar atrophy, multiple system atrophy, progressive supranuclear palsy, synucleinopathies, Down Syndrome, corticodentatonigral degeneration, progressive familial myoclonic epilepsy, strionigral degeneration, torsion dystonia, familial tremor, Gilles de la Tourette syndrome, Shy-Drager syndrome and Hallervorden-Spatz disease, as well as peripheral neuropathies such as Charcot-Marie Tooth Disease, peripheral neuropathy induced by chemotherapeutic agents (e.g. platinum-based chemoterapeutic, taxane, vincristine, bortezomib, etc.) and the like;

Mental and behavioral disorders, including psychotic disorders and schizophrenia spectrum disorders such as schizotypal (personality) disorder, delusional disorder, brief psychotic disorder, schizophreniform disorder, schizophrenia, schizoaffective disorder, substance/medication-induced psychotic disorder, and psychotic disorder due to another medical condition; bipolar disorders such as bipolar I disorder, bipolar II disorder, cyclothymic disorder, substance/medication-induced bipolar and related disorder; depressive disorders, such as disruptive mood dysregulation disorder, major depressive disorder, single and recurrent episodes, persistent depressive disorder (dysthymia), premenstrual dysphoric disorder, substance/medication-induced depressive disorder, and depressive disorder due to another medical condition; anxiety disorders, such as separation anxiety disorder, selective mutism, specific phobia, social anxiety disorder (social phobia), panic disorder, agoraphobia, generalized anxiety disorder and the like;

Cardiovascular diseases such as heart failure, myocardiopathy, atrial fibrillation, pulmonary artery hypertension, hemorrhagic shock, stroke, ischemic heart disease, myocarditis and valvular disease; Muscle Atrophy; and Cachexia.

For the uses and methods of treatment described herein, any of the compounds of the invention, including any of the embodiments thereof, may be used.

Accordingly, the invention further provides a compound of the invention, or a pharmaceutically acceptable salt thereof, for use as a medicament.

The present invention further provides a compound of the invention, or a pharmaceutically acceptable salt thereof, for use in the treatment of a disease associated with HDAC6.

The present invention further provides the use of a compound of the invention, or a pharmaceutically acceptable salt thereof, for the manufacture of a medicament for the treatment of a disease associated with HDAC6.

The present invention further provides the use of a compound of the invention, or a pharmaceutically acceptable salt thereof, for treating a disease associated with HDAC6.

The present invention further provides a compound of the invention, or a pharmaceutically acceptable salt thereof, for use as a HDAC6 inhibitor.

The present invention further provides a method for treating a disease associated with HDAC6, comprising administering a therapeutically effective amount of a compound of the invention, or a pharmaceutically acceptable salt thereof, to a patient in need thereof.

The present invention further provides a method of inhibiting HDAC6 activity, comprising administering to a patient in need of said treatment an amount of a compound of the invention, or a pharmaceutically acceptable salt thereof, sufficient to inhibit HDAC6 activity.

The present invention further provides a compound of the invention, or a pharmaceutically acceptable salt thereof, for use in the treatment of a disease selected from cancer, an autoimmune or inflammatory disease, transplant rejection, a ciliopathy, a disease of the nervous system, a mental or behavioral disorder, an infectious disease, a cardiovascular disease, muscle atrophy and cachexia.

The present invention further provides the use of a compound of the invention, or a pharmaceutically acceptable salt thereof, for the manufacture of a medicament for the treatment of a disease selected from cancer, an autoimmune or inflammatory disease, transplant rejection, a ciliopathy, a disease of the nervous system, a mental or behavioral disorder, an infectious disease, a cardiovascular disease, muscle atrophy and cachexia.

The present invention further provides the use of a compound of the invention, or a pharmaceutically acceptable salt thereof, for treating a disease selected from cancer, an autoimmune or inflammatory disease, transplant rejection, a ciliopathy, a disease of the nervous system, a mental or behavioral disorder, an infectious disease, a cardiovascular disease, muscle atrophy and cachexia.

The present invention further provides a method for treating a disease selected from cancer, an autoimmune or inflammatory disease, transplant rejection, a ciliopathy, a disease of the nervous system, a mental or behavioral disorder, an infectious disease, a cardiovascular disease, muscle atrophy and cachexia, comprising administering a therapeutically effective amount of a compound of the invention, or a pharmaceutically acceptable salt thereof, to a patient in need thereof.

The present invention further provides a method of inhibiting HDAC6 activity in a sample (e.g. a biological sample), comprising contacting said sample (e.g. said biological sample) with a compound of the invention, or a pharmaceutically acceptable salt thereof.

The present invention further provides the use of a compound of the invention, or a pharmaceutically acceptable salt thereof, as a HDAC6 inhibitor in research, particularly as a research tool compound for inhibiting HDAC6. Accordingly, the invention relates to the in vitro use of a compound of the invention, or a salt thereof (e.g. a pharmaceutically acceptable salt thereof), as a HDAC6 inhibitor and, in particular, to the in vitro use of a compound of the invention, or a salt thereof (e.g. a pharmaceutically acceptable salt thereof), as a research tool compound acting as a HDAC6 inhibitor. The invention likewise relates to a method, particularly an in vitro method, of inhibiting HDAC6, the method comprising applying a compound of the invention, or a salt thereof (e.g. a pharmaceutically acceptable salt thereof), to a sample (e.g., a biological sample). It is to be understood that the term "in vitro" is used in this specific context in the sense of "outside a living human or animal body", which includes, in particular, experiments performed with cells, cellular or subcellular extracts, and/or biological molecules in an artificial environment such as an aqueous solution or a culture medium which may be provided, e.g., in a flask, a test tube, a Petri dish, a microtiter plate, etc.

Unless otherwise stated, any description of a method of treatment includes use of the compounds to provide such treatment as is described herein, as well as use of the compounds to prepare a medicament to treat such condition.

Definitions of specific terms as used in the specification and claims are provided herein. All other technical and scientific terms used herein and not defined herein shall have the same meaning as commonly understood by one of ordinary skill in the art to which this invention pertains. In the case of conflict, the present specification, including definitions, will control.

In the case of conflict between the chemical structures and names of the compounds disclosed herein, the chemical structures will control.

The term "disease associated with HDAC6" and the like refer to any disease or condition in which HDAC6 plays a role, and/or where the disease or condition is associated with expression or activity of HDAC6, and/or diseases or conditions the course of which can be influenced by modulating HDAC6. Diseases associated with HDAC6 include, without limitation, the diseases and conditions as described herein. Preferably, the disease associated with HDAC is a disease selected from cancer, an autoimmune or inflammatory disease, transplant rejection, a ciliopathy, a disease of the nervous system, a mental or behavioral disorder, an infectious disease, a cardiovascular disease, muscle atrophy and cachexia.

As used herein, the term "subject" or "patient" or "individual" refers to any animals, including mammals, preferably mice, rats, other rodents, rabbits, dogs, cats, swine, cattle, sheep, horses, or primates, and most preferably humans.

As used herein, the term "biological sample" includes, without limitation, a cell, cell cultures or extracts thereof; biopsied material obtained from an animal, e.g. a human, or extracts thereof; and blood, saliva, urine, feces, or any other body fluids or extracts thereof.

As used herein, the term "therapeutically effective amount" refers to the amount of active compound that elicits the biological or medicinal response that is being sought in a subject (preferably a human). Accordingly, a therapeutically effective amount of a compound may be an amount which is sufficient to treat a disease or disorder, delay the onset or progression of a disease or disorder, and/or alleviate one or more symptoms of the disease or disorder, when administered to a subject suffering from said disease or disorder. The precise effective amount for a subject will depend upon a variety of factors such as the subject's body weight, size and health, the nature and extent of the condition to be treated, and the therapeutic or combination of therapeutics selected for administration. Therapeutically effective amounts for a given situation can be determined by routine experimentation that is within the skill and judgement of the clinician.

For any compound, the therapeutically effective amount can be estimated initially either in in vitro assays, e.g. cell culture assays, or in animal models, e.g. mice, rats or dogs. The animal model may also be used to determine the appropriate concentration range and route of administration. Such information can then be used to determine useful doses and routes for administration in humans. Therapeutic efficacy and toxicity may be determined by standard procedures in cell cultures or experimental animals, e.g. ED50 and LD50 values can be determined and the ratio between toxic and therapeutic effects, also known as therapeutic index, may be calculated and used to determine suitable doses for use in humans.

As used herein, unless otherwise stated, the term "treating" and "treatment" in relation to a disease, disorder or condition refers to the management and care of a patient for the purpose of combating a disease, disorder or condition, such as to reverse, alleviate, or inhibit the process of the disease, disorder or condition to which such term applies, or one or more symptoms of such disease, disorder or condition, and includes the administration of a compound of the invention (or a pharmaceutically acceptable salt thereof) for alleviating the symptoms or complications. Preferably, treatment is ameliorating.

While it is possible that a compound of the invention may be administered for use in therapy directly as such, it is typically administered in the form of a pharmaceutical composition. These compositions comprise a compound of the invention (or a pharmaceutically acceptable salt thereof) as active pharmaceutical ingredient together with one or more pharmaceutically acceptable carriers. For the purposes of the invention, a carrier is suitable for use in the pharmaceutical compositions described herein if it is compatible with the other ingredients of the composition and not deleterious to the recipient of the composition. A "pharmaceutically acceptable carrier" includes non-API (API refers to Active Pharmaceutical Ingredient) substances, such as disintegrators, binders, fillers, lubricants and the like, used in formulating pharmaceutical products and regarded as safe for administering to subjects (particularly humans) according to established governmental standards, including those promulgated by the United States Food and Drug Administration and the European Medicines Agency. Pharmaceutically acceptable carders are well known to those skilled in the art and are selected on the basis of the chosen type of formulation and route of administration, according to standard pharmaceutical practice as described for example in *Remington: The Science and Practice of Pharmacy*, 22nd edition, edited by Loyd V Allen Jr, Pharmaceutical Press, Philadelphia, 2012.

Accordingly, provided herein is a pharmaceutical composition comprising a compound of the invention, or a pharmaceutically acceptable salt thereof, and one or more pharmaceutically acceptable carriers.

Pharmaceutical compositions can be prepared in a manner well known in the pharmaceutical art, and can be administered by a variety of routes, for example via oral, parenteral, pulmonary or topical route. Parenteral administration includes intravenous, intraarterial, subcutaneous, intraperitoneal or intramuscular. Parenteral administration can be in the form of a single bolus dose, or may be, for example, by a continuous perfusion pump. Pulmonary administration includes e.g. by inhalation or insufflation of powders or aerosols, including by nebulizer. Topical administration includes transdermal, epidermal, ophthalmic and to mucous membranes including intranasal, vaginal and rectal delivery.

The compositions can be formulated to provide quick (immediate), sustained or delayed release of the active ingredient after administration to the patient by using methods known in the art.

Examples of pharmaceutically acceptable excipients include lactose, dextrose, sucrose, sorbitol, mannitol, staches, gum acacia, calcium phosphate, alginates, tragacanth, gelatin, calcium silicate, microcrystalline cellulose, polyvinylpyrrolidone, cellulose, water, and methyl cellulose. The pharmaceutical compositions can additionally include further pharmaceutically acceptable excipients including: lubricating agents such as talc, magnesium stearate and mineral oil; wetting agents; emusifying and suspending agents; preserving agents such as methyl- and propylhydroxybenzoates; sweetening agents; flavouring agents; and colouring agents.

Suitable oral dosage forms include, for examples, tablets, pills, sachets or capsules of hard or soft gelatin or any other suitable material. For example, the active compound can be incorporated into a formulation that includes pharmaceutically acceptable carriers such as binders (e.g., gelatin, cellulose, gum tragacanth), excipients (e.g., starch, lactose), lubricants (e.g., magnesium stearate, silicon dioxide), disintegrating agents (e.g., alginate, Primogel, corn starch), and sweetening or flavoring agents (e.g., glucose, sucrose, saccharin, methyl salicylate, and peppermint). They can then be compressed into tablets or enclosed in capsules using conventional techniques. The capsules and tablets can also be coated with various coatings known in the art to modify the flavors, tastes, colors, and shapes of the capsules and tablets. In addition, liquid carriers such as fatty oil can also be included in capsules. Oral formulations can also be in the form of suspensions, solutions, syrups and the like. If desired, conventional agents for modifying flavors, tastes, color and the like can be added.

Pharmaceutical compositions suitable for parenteral administration include sterile aqueous solutions or suspensions, or can be alternatively prepared in lyophilized form for extemporaneous preparation of a solution or suspension using a sterile aqueous carrier prior to use. In such formulations, diluents or pharmaceutically acceptable carriers such as sterile water and physiological saline buffer can be used. Other conventional solvents, pH buffers, stabilizers, anti-bacterial agents, surfactants, and antioxidants can all be included. For example, useful components include sodium chloride, acetates, citrates or phosphates buffers, glycerin, dextrose, fixed oils, methyl parabens, polyethylene glycol, propylene glycol, sodium bisulfate, benzyl alcohol, ascorbic acid, and the like. The parenteral formulations can be stored in any conventional containers such as vials and ampoules.

Compositions for administration by inhalation or insufflation include solutions and suspensions in pharmaceutically acceptable aqueous or organic solvents, or mixtures thereof, and powders. The liquid or solid compositions may include suitable pharmaceutically acceptable excipients as described above. Such compositions may be administered by the oral or nasal respiratory route for local or systemic effect. Compositions can be nebulized by use of a suitable gas. Nebulized solutions may be breathed directly from the nebulizing device or the nebulizing device may be attached to a face mask or the breathing chamber. Solutions, suspensions and powder compositions can be administered orally or nasally from devices which deliver the formulation in an appropriate manner.

Pharmaceutical compositions for topical administration may include transdermal patches, ointments, lotions, creams, gels, drops, suppositories, sprays, liquids and powders. Topical formulations can contain one or more conventional carriers. For example, ointments can contain water and one or more hydrophobic carriers selected from liquid paraffin, polyoxyethylene alkyl ether, propylene glycol, white vaseline and the like. Carrier compositions of creams can be based on water in combination with glycerol and one or more other components such as cetylstearyl alcohol, glycerin monostearate and the like. Gels can be formulated using isopropyl alcohol and water, suitably in combination with other excipients such as glycerol, hydroxyethyl cellulose and the like.

The pharmaceutical compositions, like oral and parenteral compositions, can be formulated in unit dosage forms for ease of administration and uniformity of dosage. As used herein, "unit dosage forms" refers to physically discrete units suitable as unitary dosages for administration to subjects, each unit containing a predetermined quantity of active ingredient calculated to produce the desired therapeutic effect, in association with one or more suitable pharmaceutical carriers.

In therapeutic applications, pharmaceutical compositions are to be administered in a manner appropriate to the disease to be treated, as determined by a person skilled in the medical arts. An appropriate dose and suitable duration and frequency of administration will be determined by such factors as the condition of the patient, the type and severity of the disease, the particular form of the active ingredient, the method of administration, among others. In general, an appropriate dose and administration regimen provides the pharmaceutical composition in an amount sufficient to provide therapeutic benefit, for example an improved clinical outcome, such as more frequent complete or partial remissions, or longer disease-free and/or overall survival, or lessening of symptoms severity, or any other objectively identifiable improvement as noted by the clinical. Effective doses may generally be assessed or extrapolated using experimental models like dose-response curves derived from in vitro or animal model test systems.

The pharmaceutical compositions of the invention can be included in a container, pack or dispenser together with instructions for administration.

The compounds of the invention can be administered as a single active agent or may also be used or administered in combination with one or more additional therapeutically active agents, e.g. drugs useful in the treatment of a disease selected from cancers, autoimmune or inflammatory diseases, transplant rejection, ciliopathies, diseases of the nervous system, mental or behavioral disorders, infectious diseases, cardiovascular diseases, muscle atrophy and cachexia. Combination therapy includes administration of a single pharmaceutical dosage formulation which contains a compound of the invention and one or more additional therapeutically active agents, as well as administration of the compound of the invention and each additional therapeutically active agent in its own separate pharmaceutical dosage formulation for separate administration. If administered separately, the administration can be simultaneous, sequential or separate, and the compound of the invention and the additional therapeutic agent(s) can be administered via the same administration route or using different administration routes, for example one compound can be administered orally and the other intravenously. Moreover, as explained above, the compounds of the invention can also be used in monotherapy, particularly in the monotherapeutic treatment of a disease selected from cancer, an autoimmune or inflammatory disease, transplant rejection, a ciliopathy, a disease of the nervous system, a mental or behavioral disorder, an infectious disease, a cardiovascular disease, muscle atrophy, and cachexia.

EXAMPLES

The following abbreviations have been used in the examples:
AcN: acetonitrile
Boc: tert-butyloxycarbonyl
DABAL-Me$_3$: bis(trimethylaluminum)-1,4-diazabicyclo[2.2.2]octane adduct
DCM: Dichloromethane
DIPEA: N,N-Diisopropylethylamine
DMF: N,N-dimethylformamide
EtOAc: ethyl acetate
EtOH: ethanol
HATU: 1-[bis(dimethylamino)methylene]-1H-1,2,3-triazolo[4,5-b]pyridinium 3-oxide hexafluorophosphate
HPLC: high performance liquid chromatography
LC-MS: liquid chromatography-mass spectroscopy
MeI: iodomethane
MeOH: methanol
PPh$_3$: triphenylphosphine
Pd(PPh$_3$)4: tetrakis(triphenylphosphine) palladium (0)
Pet ether: petroleum ether
rt (or RT): room temperature
Rt: retention time
TBAB: tetrabutylammonium bromide
TFA: trifluoroacetic acid
THF: tetrahydrofuran
One of the following methods was used for the determination by LC-MS:
Method 1: Column: KINETEX-1.7μ XB-C18 100A (50 mm×2.1 mm, 1.7 μm); Mobile Phase: A: 0.05% Formic Acid in Water B: 0.05% Formic Acid in Acetonitrile; Gradient: Time/% A: 0/97, 0.3/97, 3.2/2, 4.8/2, 5/97, 5.10/97 Column Temp: 35° C.; Flow Rate: 0.6 mL/min
Method 2: Column: Aquity UPLC BEH C18 (50 mm×2.1 mm, 1.7 μm); Mobile Phase A: 0.01 M Ammonium Acetate in water; B: AcN; Gradient: Time/% A: 0/5, 0.1/5, 2.4/100, 3.8/100, 4.0/5, 4.8/5 Column Temp: 45° C.; Flow Rate: 0.5 mL/min
Method 3: Column: Aquity UPLC BEH C18 (50 mm×2.1 mm, 1.7 μm); Mobile Phase: A: 0.1% Formic Acid in Water, B: 0.1% Formic Acid in Acetonitrile; Gradient: Time/% B: 0/5, 0.3/5, 2.5/95, 3.7/95, 4/5; Column Temp: 40° C.; Flow Rate: 0.6 mL/min
Method 4: Column—AQUITY UPLC BEH C18 (50 mm×2.1 mm, 1.7 μm); Mobile phase-A: 0.1% Formic Acid in Water, B: 0.1% Formic Acid in Acetonitrile T % A of: 0/95, 0.3/95, 2.0/5, 3.5/5, 3.6/95, 4.4/95 Flow-0.6 mL/min, Temp: 40° C.
Method 5: Column: Aquity UPLC BEH C18 (50 mm×2.1 mm, 1.7 μm); Mobile Phase A: 0.01 M Ammonium Acetate in water; B: AcN; Gradient: Time/% A: 0/5, 0.1/5, 2.4/100, 3.8/100, 4.0/5, 4.5/5 Column Temp: 50° C.; Flow Rate: 0.5 mL/min
Method 6: Column: Aquity UPLC BEH C18 (50 mm×2.1 mm, 1.7 μm); Mobile Phase: A: 0.1% Formic Acid in Water, B: 0.1% Formic Acid in Acetonitrile; Gradient: Time/% A: 0/95, 0.3/95, 2.0/5, 3.1/5, 3.5/95, 4.3/95; Column Temp: 40° C.; Flow Rate: 0.6 mL/min
Method 7: Column: Luna Omega 3 μm PS C18 100A; Mobile Phase A: 0.01 M Ammonium Formate in water:AcN (95:5); B: 0.01 M Ammonium Formate in water:AcN (5:95); Gradient: Time/% B: 0/2, 1/2, 4/98, 4.5/98, 5.5/2, 6.5/2; Flow Rate: 1.0 mL/min;
Method 8: Column—AQUITY UPLC BEH C18 (50 mm×2.1 mm, 1.7 μm); Mobile phase-A: 0.1% Formic Acid in Water, B: 0.1% Formic Acid in Acetonitrile T % A of: 0/98, 0.3/98, 3.2/2, 4.4/2, 4.7/98 Flow-0.6 mL/min, Temp: 40° C.
Method 9: Column: Aquity UPLC BEH C18 (50 mm×2.1 mm, 1.7 μm); Mobile Phase A: 0.01 M Ammonium Acetate in water; B: AcN; Gradient: Time/% A: 0/98, 0.3/98, 3.2/0, 4.5/0, 4.7/98 Column Temp: 45° C.; Flow Rate: 0.5 mL/min
Method 10: Column: XBridge BEH C18 (50 mm×2.1 mm, 2.5 μm); Mobile Phase A: 0.01 M Ammonium Acetate in water; B: AcN; Gradient: Time/% B: 0/5, 0.2/5, 7/100, 8/100, 8.5/5, 11/5; Column Temp: 50° C.; Flow Rate: 0.6 mL/min;
Method 11: Column: Phenomenex C18 (50 mm×2.1 mm, 2.6 μm); Mobile phase: A: ACN+Formic Acid 0.1%, B % water 0.1% Formic Acid; Gradient: Time/% B: 0/95, 0.3/95, 2.0/5, 3.1/5, 3.5/95, 4.3/95 Column Temp: 40° C., Flow rate: 0.6 mL/min
Method 12: Column: Aquity UPLC BEH C18 (50 mm×2.1 mm, 1.7 □m); Mobile Phase: A: 0.1% Formic Acid in Water, B: 0.1% Formic Acid in Acetonitrile; Gradient: Time/% B: 0/5, 0.3/5, 2.5/95, 3.7/95, 4/5, 4.6/5; Column Temp: 40° C.; Flow Rate: 0.6 mL/min Reference Example 1

2-(Trimethylstannyl)isonicotinonitrile

To a stirred solution of 2-bromoisoniconitrile (2 g, 10.92 mmol) in toluene (20 mL), hexamethylditin (4.6 g, 14.20 mmol), and Pd(PPh$_3$)$_4$ (1.2 g, 1.09 mmol) were added at rt. The resulting solution was degassed with nitrogen for 10 min and heated to 110° C. for 16 h. The reaction mixture was evaporated under reduced pressure and the crude compound was purified by flash column chromatography on neutral alumina using 50% EtOAc in petroleum ether to afford the title compound (1.5 g, 51.7%).

LC-MS (method 1): $R_t$=1.93 min; m/z=269.08 (M+H$^+$)

Reference Example 2

(5-Bromo-1-methyl-1H-pyrrolo[2,3-c]pyridin-2-yl)(morpholino)methanone

Step a. Methyl 5-bromo-1-methyl-1H-pyrrolo[2,3-c]pyridine-2-carboxylate

To a stirred solution of 5-bromo-1H-pyrrolo[2,3-c]pyridine-2-carboxylic acid (2 g, 8.3 mmol) in DMF (20 mL), $Cs_2CO_3$ (5.4 g, 16.6 mmol) and MeI (2.35 g, 16.6 mmol) were added at 0° C. The reaction mixture was allowed to stir at RT for 16 h. The reaction mixture was quenched with ice cooled water and the resulting solid was filtered and washed with water and n-pentane to afford 1.8 g (80.6%) of the title compound LC-MS (method 2): $R_t$=2.67 min; m/z=269.09 (M+H$^+$)

Step b. (5-Bromo-1-methyl-1H-pyrrolo[2,3-c]pyridin-2yl)(morpholino)methanone To a stirred solution of the compound obtained in step a (0.75 g, 2.8 mmol) in toluene, triethylamine (0.84 g, 8.4 mmol), morpholine (0.26 g, 3.08 mmol) and DABAL-Me$_3$ (1.07 g, 4.2 mmol) were added at 0° C. The reaction mixture was allowed to stir at 100° C. for 3 h. After the completion of the reaction it was filtered through a celite bed and washed with ethyl acetate. The resulting solution was evaporated to get a crude compound that was purified by silica gel column chromatography using 3% MeOH in DCM to afford 0.71 g (78.5%) of the title compound.

LC-MS (method 2): $R_t$=2.26 min; m/z=323.9 (M+H$^+$)

Reference Example 3

5-Bromo-N-(3-(dimethylamino)propyl)-N,1-dimethyl-1H-pyrrolo[2,3-c]pyridine-2-carboxamide

Step a. 5-Bromo-1-methyl-1H-pyrrolo[2,3-c]pyridine-2-carboxylic Acid

To a stirred solution of the compound obtained in reference example 2, section a (2.8 g, 10.4 mmol) in EtOH and water (35 mL. 1:0.1 by vol), NaOH (1.45 g, 3.5 eq) was added. The reaction mixture was stirred for 3 h at rt. After the completion of the reaction, acetic acid (1.5 mL) was added to neutralize the excess of NaOH. Solvents were evaporated under reduced pressure, and water was added. The pH was adjusted to 2-3 by the addition of 1M HCl aqueous solution. The precipitated solid was filtered, washed with $H_2O$, and dried under vacuum to get 2.4 g (90.4%) of the title compound as a grey solid.

LC-MS (method 3): $R_t$=1.36 min; m/z=255.11 (M+H$^+$)

Step b. 5-Bromo-N-(3-(dimethylamino)propyl)-N,1-dimethyl-1H-pyrrolo[2,3-c]pyridine-2-carboxamide To a stirred solution the compound obtained in step a (0.55 g, 2.2 mmol) in DMF (6 mL) $N^1$, $N^1$, $N^3$-trimethylpropane-1,3-diamine (0.51 g, 4.4 mmol), DIPEA (0.85 g, 6.6 mmol) and HATU (1.25 g, 3.3 mmol) were added successively at 0° C. and the reaction mixture was stirred at RT for 3 h. After the completion of the reaction, it was diluted with water and extracted with ethyl acetate. The combined organic layers were washed with brine, dried over anhydrous $Na_2SO_4$, filtered and evaporated under reduced pressure to afford 0.60 g (78.7%) of the title compound as a dark brown liquid.

LC-MS (method 3): $R_t$=1.05 min; m/z=353.20 (M+H$^+$)

Following a similar procedure to that described in reference example 3, but using in each case the corresponding starting materials, the following compounds were obtained:

| Reference example | Compound name | Starting material | HPLC method | $R_t$ (min) | m/z |
| --- | --- | --- | --- | --- | --- |
| 3a | 5-Bromo-N-(cyclopropylmethyl)-N,1-dimethyl-1H-pyrrolo[2,3-c]pyridine-2-carboxamide | 1-Cyclopropyl-N-methylmethanamine | 4 | 1.94 | 321.92 (M + H$^+$) |
| 3b | 5-Bromo-N-(2-methoxyethyl)-N,1-dimethyl-1H-pyrrolo[2,3-c]pyridine-2-carboxamide | 2-Methoxy-N-methylethan-1-amine | 4 | 1.73 | 325.92 (M + H$^+$) |
| 3c | 5-Bromo-N-(2-((tert-butyldimethylsilyl)oxy)ethyl)-N,1-dimethyl-1H-pyrrolo[2,3-c]pyridine-2-carboxamide | 2-((Tert-butyldimethylsilyl)oxy)-N-methylethan-1-amine | 3 | 2.36 | 426.27 (M + H$^+$) |
| 3d | Tert-butyl 4-(5-bromo-1-methyl-1H-pyrrolo[2,3-c]pyridine-2-carbonyl)piperazine-1-carboxylate | Tert-butyl piperazine-1-carboxylate | 3 | 1.86 | 425.33 (M + H$^+$ + 2) |
| 3e | 5-Bromo-N-ethyl-N,1-dimethyl-1H-pyrrolo[2,3-c]pyridine-2-carboxamide | N-Methylethanamine | 5 | 2.33 | 295.9 (M + H$^+$) |
| 3f | 5-Bromo-N,1-dimethyl-N-((1-methylpiperidin-4-yl)methyl)-1H-pyrrolo[2,3-c]pyridine-2-carboxamide | N-Methyl-1-(1-methylpiperidin-4-yl)methanamine | 3 | 1.10 | 379.23 (M + H$^+$) |
| 3g | 5-Bromo-N,N-bis(2-((tert-butyldimethylsilyl)oxy)ethyl)-1-methyl-1H-pyrrolo[2,3-c]pyridine-2-carboxamide | Bis(2-((tert-butyldimethylsilyl)oxy)ethyl)amine | 3 | 2.99 | 570.47 (M + H$^+$) |

-continued

| Reference example | Compound name | Starting material | HPLC method | R_t (min) | m/z |
|---|---|---|---|---|---|
| 3h | 5-Bromo-N,N-bis(2-methoxyethyl)-1-methyl-1H-pyrrolo[2,3-c]pyridine-2-carboxamide | Bis(2-methoxyethyl)amine | 3 | 1.54 | 370.24 (M + H$^+$) |
| 3i | (S)-(5-Bromo-1-methyl-1H-pyrrolo[2,3-c]pyridin-2-yl)(3-methylmorpholino)methanone | (S)-3-Methylmorpholine | 3 | 1.49 | 338.16 (M + H$^+$) |
| 3j | (5-Bromo-1-methyl-1H-pyrrolo[2,3-c]pyridin-2-yl)(3-hydroxypyrrolidin-1-yl)methanone | Pyrrolidin-3-ol | 3 | 1.22 | 324.24 (M + H$^+$) |
| 3k | (R)-(5-Bromo-1-methyl-1H-pyrrolo[2,3-c]pyridin-2-yl)(3-hydroxypyrrolidin-1-yl)methanone | (R)-Pyrrolidin-3-ol | 3 | 1.23 | 324.21 (M + H$^+$) |
| 3l | (S)-(5-Bromo-1-methyl-1H-pyrrolo[2,3-c]pyridin-2-yl)(3-hydroxypyrrolidin-1-yl)methanone | (S)-Pyrrolidin-3-ol | 3 | 1.25 | 324.24 (M + H$^+$) |

Reference Example 4

3-Bromo-1-(3-methoxypropyl)-1H-pyrazolo[4,3-b]pyridine

To a stirred solution of 3-bromo-1H-pyrazolo[4,3-b]pyridine (500 mg, 2.5 mmol) in DMF (2 mL), NaH (0.12 g, 5 mmol) was added. The reaction mixture was stirred at 0° C. for 15 min. Then, 1-bromo-3-methoxypropane (0.57 g, 3.75 mmol) was added at 0° C. and allowed to stir at rt overnight. After the completion of the reaction, it was diluted with water and extracted with ethyl acetate. The organic layers were dried over anhydrous Na$_2$SO$_4$, filtered and evaporated under reduced pressure. The crude compound was purified by silica gel column chromatography using 35-40% EtOAc in pet ether, to afford 0.30 g (43.9%) of the title compound.

LC-MS (method 4): R$_t$=1.71 min; m/z=270.04 (M+H$^+$).

Following a similar procedure to that described in reference example 4, but using the corresponding starting material, the following compound was obtained:

| Reference example | Compound name | Starting material | HPLC method | R_t (min) | m/z |
|---|---|---|---|---|---|
| 4a | 3-Bromo-1-((tetrahydro-2H-pyran-4-yl)methyl)-1H-pyrazolo[4,3-b]pyridine | 4-(Bromomethyl)tetrahydro-2H-pyran | 4 | 1.72 | 296.14 (M + H$^+$) |

Reference Example 5

3-Bromo-7-chloro-1H-pyrazolo[4,3-b]pyridine

To a stirred solution of 7-chloro-1H-pyrazolo[4,3-b]pyridine (400 mg, 2.6 mmol) in MeOH/H$_2$O (1:1) (5 mL), a solution of bromine (0.45 g, 2.86 mmol) in MeOH/H$_2$O (1:1) (5 mL) was added at 0° C. The resulting solution was stirred at 0° C. for 30 min. The reaction mixture precipitated out a solid that was filtered and dried to get 500 mg (82.5%) of the title compound as a yellow solid.

LC-MS (method 4): R$_t$=1.56 min; m/z=232.01 (M+H$^+$).

Reference Example 6

3-Bromo-7-chloro-1-(2-methoxyethyl)-1H-pyrazolo[4,3-b]pyridine

Following a similar procedure to that described in reference example 4, but using reference example 5 instead of 3-bromo-1H-pyrazolo[4,3-b]pyridine, the desired compound was obtained.

LC-MS (method 3): R$_t$=1.59 min; m/z=290.14 (M+H$^+$).

Following a similar procedure to that described in reference example 6, but using the corresponding starting material, the following compound was obtained:

| Reference example | Compound name | Starting material | HPLC method | $R_t$ (min) | m/z |
|---|---|---|---|---|---|
| 6a | 3-Bromo-1-(2-methoxyethyl)-1H-pyrazolo[3,4-b]pyrazine | 3-Bromo-1H-pyrazolo[3,4-b]pyrazine | 5 | 2.19 | 256.9 (M + H$^+$) |

Example 1

(1-Methyl-5-(4-(5-(trifluoromethyl)-1,2,4-oxadiazol-3-yl)pyridin-2-yl)-1H-pyrrolo[2,3-c]pyridin-2-yl)(morpholino)methanone

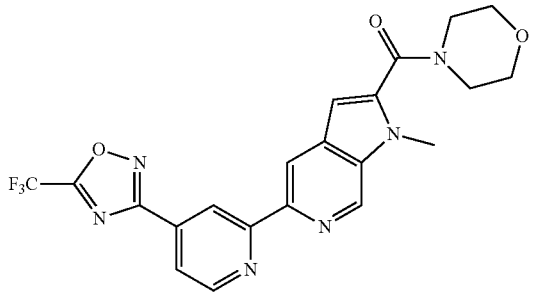 [SMILES: Cn1c(C(=O)N2CCOCC2)cc2cc(-c3cc(-c4noc(C(F)(F)F)n4)ccn3)ncc21]

Step a. 2-(1-Methyl-2-(morpholine-4-carbonyl)-1H-pyrrolo[2,3-c]pyridin-5-yl)isonicotinonitrile To a stirred solution of reference example 2 (700 mg, 2.2 mmol) in 1,4-dioxane (70 mL), reference example 1 (640 mg, 2.42 mmol), CsF (660 mg, 4.4 mmol) and CuI (83 mg, 0.44 mmol) were added. The resulting solution was degassed with nitrogen for 5 minutes, and then Pd(PPh$_3$)$_4$ (250 mg, 0.22 equiv) was added. The reaction mixture was again degassed for another 5 min, and then heated at 110° C., for 16 h. The crude reaction was filtered through a celite pad, washed with EtOAc (50 mL), and the filtrated solution was evaporated to dryness. The crude compound was purified by prep HPLC using ammonium bicarbonate buffer to afford the title compound (185 mg, 24%) as an off white solid.

LC-MS (method 2): $R_t$=2.35 min; m/z=348.1 (M+H$^+$).

Step b. (Z)-N-Hydroxy-2-(1-methyl-2-(morpholine-4-carbonyl)-1H-pyrrolo[2,3-c]pyridin-5-yl)isonicotinimidamide To a stirred solution of the compound obtained in step a (165 mg, 0.5 mmol) in EtOH (16.5 mL), NH$_2$OH·HCl (200 mg, 3 mmol), Na$_2$CO$_3$ (0.10 g, 1.0 mmol) and water (1.65 mL) were added. The resulting solution was stirred at rt for 16 h. The reaction mixture was evaporated under vacuum, poured into ice water (20 mL) and extracted with 10% methanol in DCM. The organic layer was dried over anhydrous Na$_2$SO$_4$, filtered and the filtrated solution was concentrated to get the title compound (0.18 g, 99%), as an off white solid.

LC-MS (method 6): $R_t$=0.83 min; m/z=381.33 (M+H$^+$).

Step c. 1-Methyl-5-(4-(5-(trifluoromethyl)-1,2,4-oxadiazol-3-yl)pyridin-2-yl)-1H-pyrrolo[2,3-c]pyridin-2-yl)(morpholino)methanone To a stirred solution the compound obtained in step b (180 mg, 0.50 mmol) in THF (1.8 mL), trifluoroacetic anhydride (310 mg, 1.5 mmol) was added. The resulting solution was heated at 70° C. for 3h. The reaction mixture was evaporated under vacuum, poured into ice water (20 mL) and extracted with EtOAc (2×80 mL). The organic layer was dried over anhydrous Na$_2$SO$_4$, filtered and the filtrated solution was concentrated to get a crude residue that was purified by prep HPLC to afford the title compound (93 mg, 42.8%) as an off white solid.

LC-MS (method 6): $R_t$=1.38; m/z=459.33 (M+H$^+$).

Following a similar procedure to that described in example 1, but using in each case the corresponding starting materials, the following compounds were obtained:

| Example | Compound name | Starting material | HPLC method | $R_t$ (min) | m/z |
|---|---|---|---|---|---|
| 1a | N-(3-(Dimethylamino)propyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide (**) | Reference example 3 | 8 | 1.25 | 488.35 (M + H$^+$) |

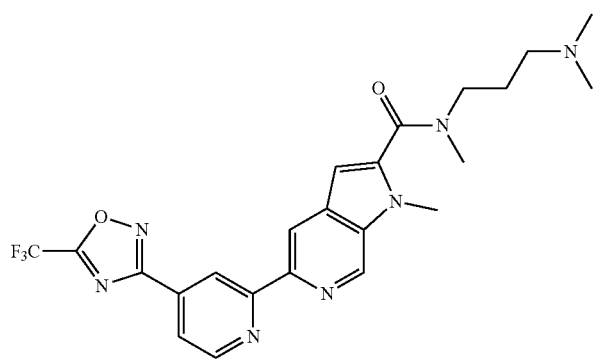 [SMILES: CN(C)CCCN(C)C(=O)c1cc2cc(-c3cc(-c4noc(C(F)(F)F)n4)ccn3)ncc2n1C]

-continued

| Example | Compound name | Starting material | HPLC method | R$_t$ (min) | m/z |
|---|---|---|---|---|---|
| 1b | N-(2-Hydroxyethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide (**) | Reference example 3c | 3 | 1.40 | 447.27 (M + H$^+$) |
| 1c | N,1-Dimethyl-N-((l-methylpiperidin-4-yl)methyl)-5-(4-(5-(trifluoromethyl)-1,2,4-oxadiazol-3-yl)pyridin-2-yl)-1H-pyrrolo[2,3-c]pyridine-2-carboxamide (***) | Reference example 3f | 9 | 2.13 | 514.40 (M + H$^+$) |
| 1d | N,N-Bis(2-hydroxyethyl)-1-methyl-5-(4-(5-(trifluoromethyl)-1,2,4-oxadiazol-3-yl)pyridin-2-yl)-1H-pyrrolo[2,3-c]pyridine-2-carboxamide (*)(***) | Reference example 3g | 3 | 1.33 | 477.36 (M + H$^+$) |
| 1e | 3-(2-(1-(3-Methoxypropyl)-1H-pyrazolo[4,3-b]pyridin-3-yl)pyridin-4-yl)-5-(trifluoromethyl)-1,2,4-oxadiazole | Reference example 4 | 4 | 2.09 | 405.22 (M + H$^+$) |

-continued

| Example | Compound name | Starting material | HPLC method | R$_t$ (min) | m/z |
|---|---|---|---|---|---|
| 1f | 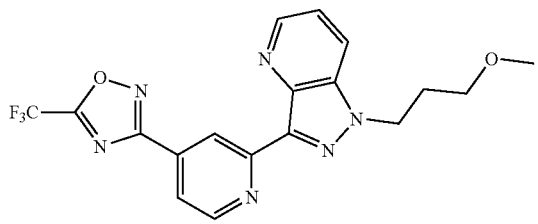<br>3-(2-(1-((Tetrahydro-2H-pyran-4-yl)methyl)-1H-pyrazolo[4,3-b]pyridin-3-yl)pyridin-4-yl)-5-(trifluoromethyl)-1,2,4-oxadiazole (**) | Reference example 4a | 6 | 1.66 | 431.31 (M + H$^+$) |
| 1g | 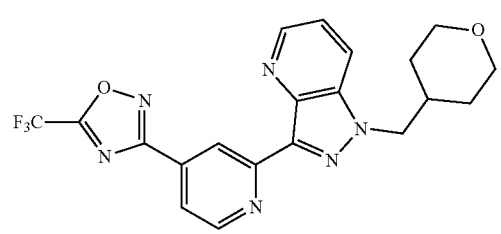 [SMILES: FC(F)(F)c1nc(-c2ccnc(-c3nn(CC4CCOCC4)c4cccnc34)c2)no1]<br>3-(2-(1-(2-Methoxyethyl)-1H-pyrazolo[3,4-b]pyrazin-3-yl)pyridin-4-yl)-5-(trifluoromethyl)-1,2,4-oxadiazole | Reference example 6a | 4 | 2.08 | 392.23 (M + H$^+$) |
| 1h | 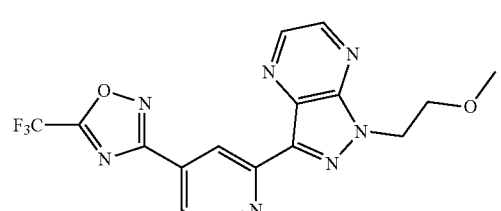<br>N-(Cyclopropylmethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide | Reference example 3a | 3 | 1.70 | 457.73 (M + H$^+$) |
| 1i | 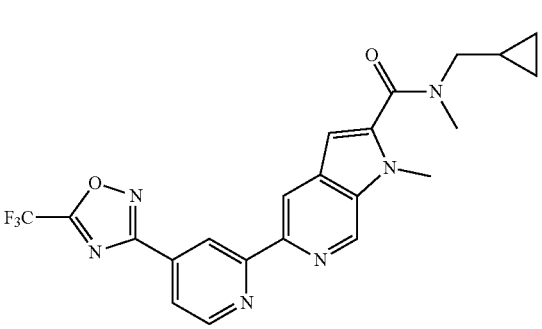<br>N-(2-Methoxyethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide (**) | Reference example 3b | 3 | 1.56 | 461.36 (M + H$^+$) |

| Example | Compound name | Starting material | HPLC method | R$_t$ (min) | m/z |
|---|---|---|---|---|---|
| 1j | N-Ethyl-N,1-dimethyl-5-(4-(5-(trifluoromethyl)-1,2,4-oxadiazol-3-yl)pyridin-2-yl)-1H-pyrrolo[2,3-c]pyridine-2-carboxamide (**) | Reference example 3e | 3 | 1.58 | 431.81 (M + H$^+$) |
| 1k | N,N-Bis(2-methoxyethyl)-1-methyl-5-(4-(5-(trifluoromethyl)-1,2,4-oxadiazol-3-yl)pyridin-2-yl)-1H-pyrrolo[2,3-c]pyridine-2-carboxamide | Reference example 3h | 3 | 3.27 | 505.28 (M + H$^+$) |
| 1l | (S)-(1-Methyl-5-(4-(5-(trifluoromethyl)-1,2,4-oxadiazol-3-yl)pyridin-2-yl)-1H-pyrrolo[2,3-c]pyridin-2-yl)(3-methylmorpholino)methanone | Reference example 3i | 3 | 1.61 | 473.73 (M + H$^+$) |

| Example | Compound name | Starting material | HPLC method | R_t (min) | m/z |
|---|---|---|---|---|---|
| 1m | (3-Hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone (**) | Reference example 3j | 3 | 1.41 | 459.33 (M + H⁺) |
| 1n | (R)-(3-Hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone (*) | Reference example 3k | 3 | 1.46 | 459.29 (M + H⁺) |
| 1o | (S)-(3-Hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone | Reference example 3l | 3 | 1.42 | 459.43 (M + H⁺) |

| Example | Compound name | Starting material | HPLC method | $R_t$ (min) | m/z |
|---|---|---|---|---|---|

[Structure: compound containing F₃C-oxadiazole-pyridine-pyrrolo[2,3-c]pyridine-carbonyl-(3-hydroxypyrrolidine)]

(*) After step c, 0.1% HCOOH in H₂O was added for complete trifluoracetate deproection.
(**) In step b, 1:02 EtOH:water was used as solvent
(***) In step b, 1:1:0.5 EtOH:MeOH:water was used as solvent

Example 2

N-(Cyclopropylmethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide hydrochloride The hydrochloride salt of the compound of example 1h was prepared by dissolving the compound from example 1 h (0.056 g, 0.1 mmol) in 1,4-dioxane (1 mL) and then adding 4M HCl in dioxane (1 mL) at 0° C. The resulting mixture was stirred at RT for 20 min. After this time, solvents were evaporated under reduced pressure followed by lyophilization to afford 45 mg (75%) of the title compound.

LC-MS (method 3): $R_t$=1.72 min; m/z=457.41(M+H⁺).

Following a similar procedure to that described in example 2, but using in each case the corresponding starting materials, the following compounds were obtained:

| Example | Compound name | Starting material | HPLC method | $R_t$ (min) | m/z |
|---|---|---|---|---|---|
| 2a | N-(2-Methoxyethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide hydrochloride | Example 1i | 3 | 1.56 | 461.36 (M + H⁺) |
| 2b | N-Ethyl-N,1-dimethyl-5-(4-(5-(trifluoromethyl)-1,2,4-oxadiazol-3-yl)pyridin-2-yl)-1H-pyrrolo[2,3-c]pyridine-2-carboxamide hydrochloride | Example 1j | 3 | 1.58 | 431.81 (M + H⁺) |
| 2c | N,N-Bis(2-methoxyethyl)-1-methyl-5-(4-(5-(trifluoromethyl)-1,2,4-oxadiazol-3-yl)pyridin-2-yl)-1H-pyrrolo[2,3-c]pyridine-2-carboxamide hydrochloride | Example 1k | 3 | 3.27 | 505.28 (M + H⁺) |
| 2d | (S)-(1-Methyl-5-(4-(5-(trifluoromethyl)-1,2,4-oxadiazol-3-yl)pyridin-2-yl)-1H-pyrrolo[2,3-c]pyridin-2-yl)(3-methylmorpholino)methanone hydrochloride | Example 1l | 3 | 1.61 | 473.73 (M + H⁺) |
| 2e | (3-Hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone hydrochloride | Example 1m | 3 | 1.44 | 459.39 (M + H⁺) |
| 2f | (1-Methyl-5-(4-(5-(trifluoromethyl)-1,2,4-oxadiazol-3-yl)pyridin-2-yl)-1H-pyrrolo[2,3-c]pyridin-2-yl)(morpholino)methanone hydrochloride | Example 1 | 11 | 1.25 | 459.3 (M + H⁺) |
| 2g | (R)-(3-Hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone hydrochloride | Example 1n | 3 | 1.44 | 459.30 (M + H⁺) |
| 2h | (S)-(3-Hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone hydrochloride | Example 1o | 3 | 1.43 | 459.34 (M + H⁺) |

Example 3

(1-Methyl-5-(4-(5-(trifluoromethyl)-1,2,4-oxadiazol-3-yl)pyridin-2yl)-1H-pyrrolo[2,3-c]pyridin-2-yl)(morpholino)methanone mesylate The mesylate salt of the compound of example 1 was prepared by dissolving the compound from example 1 (0.011 g, 0.02 mmol) in acetonitrile (2 mL), and then adding methanesulfonic acid (2.3 mg, 0.02 mmol) at 0° C. The resulting mixture was stirred at RT for 30 min. After this time, solvents were evaporated under reduced pressure followed by lyophilization to afford 0.013 g (quantitative yield) of the title compound. LC-MS (method 10): R$_t$=2.82 min; m/z=459.0 (M+H$^+$).

Example 4

(1-Methyl-5-(4-(5-(trifluoromethyl)-1,2,4-oxadiazol-3-yl)pyridin-2-yl)-1H-pyrrolo[2,3-c]pyridin-2-yl)(piperazin-1-yl)methanone

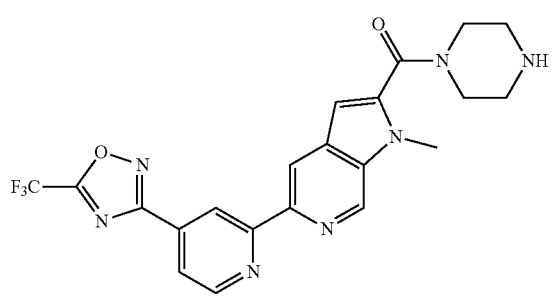 [SMILES: Cn1c(C(=O)N2CCNCC2)cc2cc(-c3cc(-c4noc(C(F)(F)F)n4)ccn3)ncc21]

Step a. Tert-butyl 4-(5-(4-cyanopyridin-2-yl)-1-methyl-1H-pyrrolo[2,3-c]pyridine-2-carbonyl)piperazine-1-carboxylate Following a similar procedure to that described in example 1, section a, but using reference example 3d instead of reference example 2, the desired compound was obtained.
LC-MS (method 4): R$_t$=1.81 min; m/z=447.99 (M+H$^+$).

Step b. Tert-butyl 4-(5-(4-(N-hydroxycarbamimidoyl)pyridin-2-yl)-1-methyl-1H-pyrrolo[2,3-c]pyridine-2-carbonyl)piperazine-1-carboxylate Following a similar procedure to that described in example 1, section b, but using the compound obtained in the step a instead of 2-(1-methyl-2-(morpholine-4-carbonyl)-1H-pyrrolo[2,3-c]pyridin-5-yl)isonicotinonitrile, the desired compound was obtained.
LC-MS (method 3): R$_t$=1.29 min; m/z=480.37 (M+H$^+$).

Step c. Tert-butyl 4-(1-methyl-5-(4-(5-(trifluoromethyl)-1,2,4-oxadiazol-3-yl)pyridin-2-yl)-1H-pyrrolo[2,3-c]pyridine-2-carbonyl)piperazine-1-carboxylate Following a similar procedure to that described in example 1, section c, but using the compound obtained in the step b instead of (Z)-N'-hydroxy-2-(1-methyl-2-(morpholine-4-carbonyl)-1H-pyrrolo[2,3-c]pyridin-5-yl)isonicotinimidamide, the desired compound was obtained
LC-MS (method 3): R$_t$=1.88 min; m/z=558.36 (M+H$^+$).

Step d. (1-Methyl-5-(4-(5-(trifluoromethyl)-1,2,4-oxadiazol-3-yl)pyridin-2-yl)-1H-pyrrolo[2,3-c]pyridin-2-yl)(piperazin-1-yl)methanone To a stirred solution of the compound obtained in step c (0.1 g, 0.2 mmol) in 1,4-dioxane (3 ml) was added 4M HCl in dioxane (1 mL) at 0° C. The reaction mixture was stirred at RT for 1 h. After that time, solvents were evaporated under reduced pressure, triturated with diethyl ether and lyophilized to afford 28 mg (29.5%) of the title compound, obtained as the dihydrochloride salt.
LC-MS (method 10): R$_t$=2.61 min; m/z=458.0 (M+H$^+$).

Example 5

3-(2-(7-Chloro-1-(2-methoxyethyl)-1H-pyrazolo[4,3-b]pyridin-3-yl)pyridin-4-yl)-5-(trifluoromethyl)-1,2,4-oxadiazole

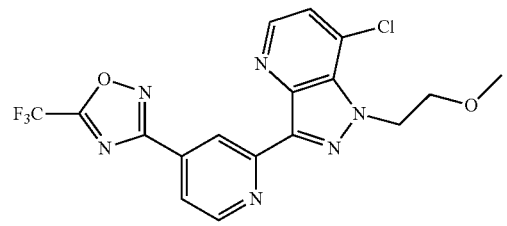 [SMILES: COCCn1nc(-c2cc(-c3noc(C(F)(F)F)n3)ccn2)c2nccc(Cl)c21]

Step a. 2-(7-Chloro-1-(2-methoxyethyl)-1H-pyrazolo[4,3-b]pyridin-3-yl)isonicotinonitrile Following a similar procedure to that described in example 1, section a, but using reference example 6 instead of reference example 2, toluene instead of dioxane as solvent and without adding CsF and CuI, the title compound was obtained.
LC-MS (method 3): R$_t$=1.65 min; m/z=314.25 (M+H$^+$).

Step b. 2-(7-Chloro-1-(2-methoxyethyl)-1H-pyrazolo[4,3-b]pyridin-3-yl)-N-hydroxyisonicotinimidamide Following a similar procedure to that described in example 1, section b, but using the compound obtained in step a instead of 2-(1-methyl-2-(morpholine-4-carbonyl)-1H-pyrrolo[2,3-c]pyridin-5-yl)isonicotinonitrile, and using EtOH:MeOH:H$_2$O (1:1:0.5) instead of EtOH as solvent, the desired compound was obtained.
LC-MS (method 3): R$_t$=1.17 min; m/z=347.30 (M+H$^+$).

Step c. 3-(2-(7-Chloro-1-(2-methoxyethyl)-1H-pyrazolo[4,3-b]pyridin-3-yl)pyridin-4-yl)-5-(trifluoromethyl)-1,2,4-oxadiazole Following a similar procedure to that described in example 1, section c, but using the compound obtained in step b instead of (Z)-N'-hydroxy-2-(1-methyl-2-(morpholine-4-carbonyl)-1H-pyrrolo[2,3-c]pyridin-5-yl)isonicotinimidamide, and adding POCl$_3$ (2 equiv) for cyclation completion, the desired compound was obtained.
LC-MS (method 4): R$_t$=2.35 min; m/z=425.12 (M+H$^+$).

Example 6

(S)-(3-Hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone (+) Camphorsulfonate Salt The (+) camphorsulfonate salt of the compound of example 10 was prepared by dissolving the compound from example 1o (0.1 g, 0.21 mmol) in MeOH (2 mL) and then adding (1S)-(+)-10-camphorsulfonic acid (0.05 g, 0.21 mmol) at 0° C. The reaction mixture was allowed to stir at RT for 30 min. After this time, diethyl ether was added and the immediately precipitated solid was filtered off, dried under vacuum to afford 0.1 g (69%) of the tittle compound HPLC as pale brown solid.

LC-MS (method 12): Rt=1.72 min; m/z=459.10(M+H+).

Example 7

HDAC6 Enzyme Inhibition Assay

Method

A fluorimetric assay was used to determine the biochemical activity of the inhibitors on HDAC6 in 96-Well Half Area Black Microplates (Corning #3686)+TopSeal-A Black Sealing Film (Perkin Elmer #6050173). Test compounds were dissolved in DMSO. Half-log serial dilutions of test compounds were prepared in DMSO and then diluted 1:10 in assay buffer (BPS Bioscience #50031).

2.5 µL of enzyme (BPS Bioscience #50006) was incubated with 2.5 µL of test compounds for 3 hours in assay buffer with 0.1 mg/mL Bovine Serum Albumin (Sigma-Aldrich #A7030) at 21° C. in 22.5 µL total volume. The enzymatic reaction was started with the addition of 2.5 µL of a fluorogenic acetylated peptide substrate (BPS Bioscience #50037). The final concentration of enzyme and substrate in the reaction were 8.8 nM and 9 µM, respectively. After 45 minutes of incubation at 37° C., the addition of 25 µL of a development solution (BPS Bioscience #50030) releases a fluorophore whose amount is proportional to the amount of the deacetylated product. Fluorescence intensity was measured after 15 minutes incubation at 21° C. with a Tecan Infinite F200 microplate reader (excitation 360 nm-emission 460 nm).

The negative control (background) was represented by the reaction mix in the absence of the enzyme (with 0.1% DMSO), while the positive control of deacetylase activity was obtained in the absence of test compounds (with 0.1% DMSO) after background subtraction. Percentage of inhibition was calculated as a fraction of the positive control.

Results

The results obtained in the above assays with compounds of the invention are shown in the table below:

| Example | HDAC6 % inh @ 1 µM | HDAC6 % inh @ 0.3 µM | HDAC6 % inh @ 0.1 µM |
| --- | --- | --- | --- |
| 1 | | 87 | 59 |
| 1a | | 91 | 74 |
| 1b | 95 | 88 | 72 |
| 1c | 98 | 94 | 85 |
| 1d | 96 | 91 | 79 |
| 1e | 95 | 88 | 68 |
| 1f | 94 | 81 | 54 |
| 1g | 80 | 56 | 28 |
| 2 | 96 | 92 | 75 |
| 2a | 97 | 89 | 66 |
| 2b | 96 | 95 | 89 |
| 2c | 97 | 91 | 71 |
| 2d | 96 | 86 | 64 |
| 2e | 97 | 92 | 78 |
| 2g | 97 | 86 | 78 |
| 2h | 94 | 80 | 65 |
| 3 | 93 | 84 | 59 |
| 4 | 95 | 86 | 69 |
| 5 | 94 | 82 | 61 |
| 6 | 91 | 81 | 61 |

As is evident from the table above, the compounds of the invention exhibit potent HDAC6 inhibitory activity.

Example 8

In Vitro HDAC6 Cell-Based Assay

In order to determine the cellular activity of HDAC6 upon treatment with HDAC6 inhibitors, acetylation levels of Alpha-Tubulin (a HDAC6-specific substrate) were measured by Western Blot. For this, MOLP8 cells were seeded in 6-well plates at a cell density of 500.000 cells/well and treated with the test compounds at 5 and 1 µM for 18 h at 37° C. and 5% $CO_2$ in a humidified tissue culture incubator. Consecutively, cell pellets were collected and whole protein extracts prepared using RIPA buffer (SIGMA) supplemented with 1× protease inhibitors (cOmplete mini, Roche). Protein concentration was determined with Bradford's reagent (Bio-Rad) as per manufacturer's instructions, and 7 µg of total protein were loaded into pre-cast 10% NuPAGE Novex gels (Life Technologies). Gels were run in MOPS-SDS buffer (Life Technologies) and proteins were transferred using the iBlot 2 Dry Blotting System (Life Technologies). Blots were subsequently rinsed in distilled water and stained with Ponceau S solution (SIGMA). Blots were then washed in distilled water to remove Ponceau excess and scanned with the Epson Perfection V600 Photo professional Scanner. After this, blots were de-stained and blocked in 5% milk/PBS-Tween 0.1% for 1 h at room temperature followed by incubation with anti-Acetyl-alpha Tubulin (SIGMA cat. #T7451, 1:10.000 dilution) and anti-Beta—actin (SIGMA, cat. #A5316, 1:2.000 dilution) primary antibodies in 5% milk/PBS-T 0.1%, overnight at 4° C. on a shaking platform. After incubation, blots were washed 3 times for 5 minutes each in PBS-Tween 0.5% and incubated with anti-mouse HRP-conjugated secondary antibody (Jackson Immuno Research, cat. #115-035-068) at 1:8.000 in 5% milk/PBS-Tween 0.1%, 1 h at room temperature on a shaking platform. After 3 washes of 5 minutes each with PBS-Tween 0.5% and 1 wash in PBS 1×, blots were developed with ECL Plus (GE Healthcare) and the chemiluminescent reaction imaged with the G:Box Chemi XRQ (Syngene) imaging system. WB and Ponceau images were analysed with ImageJ software, WB band intensities normalized by either total protein or Beta-actin content and made relative to ACY-1215 1 µM (equivalent to 100%). ACY-1215 is a HDAC6 inhibitor, and is also known as ricolinostat, with chemical name 2-(diphenylamino)-N-[7-(hydroxyamino)-7-oxoheptyl]-5-pyrimidinecarboxamide.

The compounds of the invention were tested in this assay at 1 and 5 μM and were found to inhibit the cellular activity of HDAC6.

The invention claimed is:

1. A compound selected from the group consisting of:
   (3-hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone,
   (1-methyl-5-(4-(5-(trifluoromethyl)-1,2,4-oxadiazol-3-yl)pyridin-2-yl)-1H-pyrrolo[2,3-c]pyridin-2-yl)(morpholino)methanone,
   N-(3-(dimethylamino) propyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide,
   N-(2-hydroxyethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide,
   N,1-dimethyl-N-((1-methylpiperidin-4-yl)methyl)-5-(4-(5-(trifluoromethyl)-1,2,4-oxadiazol-3-yl)pyridin-2-yl)-1H-pyrrolo[2,3-c]pyridine-2-carboxamide,
   N,N-bis(2-hydroxyethyl)-1-methyl-5-(4-(5-(trifluoromethyl)-1,2,4-oxadiazol-3-yl)pyridin-2-yl)-1H-pyrrolo[2,3-c]pyridine-2-carboxamide,
   N-(cyclopropylmethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide,
   N-(2-methoxyethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide,
   (1-methyl-5-(4-(5-(trifluoromethyl)-1,2,4-oxadiazol-3-yl)pyridin-2-yl)-1H-pyrrolo[2,3-c]pyridin-2-yl)(piperazin-1-yl)methanone,
   N-ethyl-N,1-dimethyl-5-(4-(5-(trifluoromethyl)-1,2,4-oxadiazol-3-yl)pyridin-2-yl)-1H-pyrrolo[2,3-c]pyridine-2-carboxamide,
   N,N-bis(2-methoxyethyl)-1-methyl-5-(4-(5-(trifluoromethyl)-1,2,4-oxadiazol-3-yl)pyridin-2-yl)-1H-pyrrolo[2,3-c]pyridine-2-carboxamide,
   (S)-(1-methyl-5-(4-(5-(trifluoromethyl)-1,2,4-oxadiazol-3-yl)pyridin-2-yl)-1H-pyrrolo[2,3-c]pyridin-2-yl)(3-methylmorpholino)methanone,
   3-(2-(1-(3-methoxypropyl)-1H-pyrazolo[4,3-b]pyridin-3-yl)pyridin-4-yl)-5-(trifluoromethyl)-1,2,4-oxadiazole,
   3-(2-(1-((tetrahydro-2H-pyran-4-yl)methyl)-1H-pyrazolo[4,3-b]pyridin-3-yl)pyridin-4-yl)-5-(trifluoromethyl)-1,2,4-oxadiazole,
   3-(2-(7-chloro-1-(2-methoxyethyl)-1H-pyrazolo[4,3-b]pyridin-3-yl)pyridin-4-yl)-5-(trifluoromethyl)-1,2,4-oxadiazole, and
   3-(2-(1-(2-methoxyethyl)-1H-pyrazolo[3,4-b]pyrazin-3-yl)pyridin-4-yl)-5-(trifluoromethyl)-1,2,4-oxadiazole;
   or a salt thereof.

2. A compound according to claim 1, wherein the compound is (3-hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone, or a salt thereof.

3. A compound according to claim 2, wherein the compound is (R)-(3-hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone, or a salt thereof.

4. A compound according to claim 2, wherein the compound is(S)-(3-hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone, or a salt thereof.

5. A compound according to claim 1, wherein the compound is N,1-dimethyl-N-((1-methylpiperidin-4-yl)methyl)-5-(4-(5-(trifluoromethyl)-1,2,4-oxadiazol-3-yl)pyridin-2-yl)-1H-pyrrolo[2,3-c]pyridine-2-carboxamide, or a salt thereof.

6. A compound according to claim 1, wherein the compound is N-(cyclopropylmethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide, or a salt thereof.

7. A compound according to claim 1, wherein the compound is N-ethyl-N,1-dimethyl-5-(4-(5-(trifluoromethyl)-1,2,4-oxadiazol-3-yl)pyridin-2-yl)-1H-pyrrolo[2,3-c]pyridine-2-carboxamide, or a salt thereof.

8. A pharmaceutical composition which comprises a compound of claim 1 or a pharmaceutically acceptable salt thereof, and a pharmaceutically acceptable carrier.

9. A method for treating a HDAC6 disease, comprising administering a therapeutically effective amount of a compound selected from the group consisting of:
   (3-hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone,
   (1-methyl-5-(4-(5-(trifluoromethyl)-1,2,4-oxadiazol-3-yl)pyridin-2-yl)-1H-pyrrolo[2,3-c]pyridin-2-yl)(morpholino)methanone,
   N-(3-(dimethylamino) propyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide,
   N-(2-hydroxyethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide,
   N,1-dimethyl-N-((1-methylpiperidin-4-yl)methyl)-5-(4-(5-(trifluoromethyl)-1,2,4-oxadiazol-3-yl)pyridin-2-yl)-1H-pyrrolo[2,3-c]pyridine-2-carboxamide,
   N,N-bis(2-hydroxyethyl)-1-methyl-5-(4-(5-(trifluoromethyl)-1,2,4-oxadiazol-3-yl)pyridin-2-yl)-1H-pyrrolo[2,3-c]pyridine-2-carboxamide,
   N-(cyclopropylmethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide,
   N-(2-methoxyethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide,
   (1-methyl-5-(4-(5-(trifluoromethyl)-1,2,4-oxadiazol-3-yl)pyridin-2-yl)-1H-pyrrolo[2,3-c]pyridin-2-yl)(piperazin-1-yl)methanone,
   N-ethyl-N,1-dimethyl-5-(4-(5-(trifluoromethyl)-1,2,4-oxadiazol-3-yl)pyridin-2-yl)-1H-pyrrolo[2,3-c]pyridine-2-carboxamide,
   N,N-bis(2-methoxyethyl)-1-methyl-5-(4-(5-(trifluoromethyl)-1,2,4-oxadiazol-3-yl)pyridin-2-yl)-1H-pyrrolo[2,3-c]pyridine-2-carboxamide,
   (S)-(1-methyl-5-(4-(5-(trifluoromethyl)-1,2,4-oxadiazol-3-yl)pyridin-2-yl)-1H-pyrrolo[2,3-c]pyridin-2-yl)(3-methylmorpholino)methanone,
   3-(2-(1-(3-methoxypropyl)-1H-pyrazolo[4,3-b]pyridin-3-yl)pyridin-4-yl)-5-(trifluoromethyl)-1,2,4-oxadiazole,
   3-(2-(1-((tetrahydro-2H-pyran-4-yl)methyl)-1H-pyrazolo[4,3-b]pyridin-3-yl)pyridin-4-yl)-5-(trifluoromethyl)-1,2,4-oxadiazole,
   3-(2-(7-chloro-1-(2-methoxyethyl)-1H-pyrazolo[4,3-b]pyridin-3-yl)pyridin-4-yl)-5-(trifluoromethyl)-1,2,4-oxadiazole, and
   3-(2-(1-(2-methoxyethyl)-1H-pyrazolo[3,4-b]pyrazin-3-yl)pyridin-4-yl)-5-(trifluoromethyl)-1,2,4-oxadiazole
   or a pharmaceutically acceptable salt thereof, to a patient in need thereof.

10. A method for treating a disease selected from cancer, an autoimmune or inflammatory disease, transplant rejection, a ciliopathy, a disease of the nervous system, a mental or behavioral disorder, an infectious disease, a cardiovascular disease, muscle atrophy and cachexia, comprising administering a therapeutically effective amount of a compound selected from the group consisting of:
- (3-hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone,
- (1-methyl-5-(4-(5-(trifluoromethyl)-1,2,4-oxadiazol-3-yl)pyridin-2-yl)-1H-pyrrolo[2,3-c]pyridin-2-yl)(morpholino)methanone,
- N-(3-(dimethylamino) propyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide,
- N-(2-hydroxyethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide,
- N,1-dimethyl-N-((1-methylpiperidin-4-yl)methyl)-5-(4-(5-(trifluoromethyl)-1,2,4-oxadiazol-3-yl)pyridin-2-yl)-1H-pyrrolo[2,3-c]pyridine-2-carboxamide,
- N,N-bis(2-hydroxyethyl)-1-methyl-5-(4-(5-(trifluoromethyl)-1,2,4-oxadiazol-3-yl)pyridin-2-yl)-1H-pyrrolo[2,3-c]pyridine-2-carboxamide,
- N-(cyclopropylmethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide,
- N-(2-methoxyethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide,
- (1-methyl-5-(4-(5-(trifluoromethyl)-1,2,4-oxadiazol-3-yl)pyridin-2-yl)-1H-pyrrolo[2,3-c]pyridin-2-yl)(piperazin-1-yl)methanone,
- N-ethyl-N,1-dimethyl-5-(4-(5-(trifluoromethyl)-1,2,4-oxadiazol-3-yl)pyridin-2-yl)-1H-pyrrolo[2,3-c]pyridine-2-carboxamide,
- N,N-bis(2-methoxyethyl)-1-methyl-5-(4-(5-(trifluoromethyl)-1,2,4-oxadiazol-3-yl)pyridin-2-yl)-1H-pyrrolo[2,3-c]pyridine-2-carboxamide,
- (S)-(1-methyl-5-(4-(5-(trifluoromethyl)-1,2,4-oxadiazol-3-yl)pyridin-2-yl)-1H-pyrrolo[2,3-c]pyridin-2-yl)(3-methylmorpholino)methanone,
- 3-(2-(1-(3-methoxypropyl)-1H-pyrazolo[4,3-b]pyridin-3-yl)pyridin-4-yl)-5-(trifluoromethyl)-1,2,4-oxadiazole,
- 3-(2-(1-((tetrahydro-2H-pyran-4-yl)methyl)-1H-pyrazolo[4,3-b]pyridin-3-yl)pyridin-4-yl)-5-(trifluoromethyl)-1,2,4-oxadiazole,
- 3-(2-(7-chloro-1-(2-methoxyethyl)-1H-pyrazolo[4,3-b]pyridin-3-yl)pyridin-4-yl)-5-(trifluoromethyl)-1,2,4-oxadiazole, and
- 3-(2-(1-(2-methoxyethyl)-1H-pyrazolo[3,4-b]pyrazin-3-yl)pyridin-4-yl)-5-(trifluoromethyl)-1,2,4-oxadiazole, or a pharmaceutically acceptable salt thereof, to a patient in need thereof.

11. The method according to claim 9, wherein the patient to be treated is a human.

12. The method according to claim 10, wherein the patient to be treated is a human.

13. The method according to claim 10, wherein the disease is a disease of the nervous system.

14. The method according to claim 13, wherein the disease of the nervous system is a peripheral neuropathy.

15. The method according to claim 14, wherein the peripheral neuropathy is Charcot-Marie Tooth disease or a chemotherapy-induced peripheral neuropathy.

16. The method according to claim 13, wherein the disease of the nervous system is amyotrophic lateral sclerosis.

17. The method according to claim 10, wherein the compound is (R)-(3-hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone, or a pharmaceutically acceptable salt thereof.

18. The method according to claim 13, wherein the compound is (R)-(3-hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone, or a pharmaceutically acceptable salt thereof.

19. The method according to claim 14, wherein the compound is (R)-(3-hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone, or a pharmaceutically acceptable salt thereof.

20. The method according to claim 15, wherein the compound is (R)-(3-hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone, or a pharmaceutically acceptable salt thereof.

21. The method according to claim 16, wherein the compound is (R)-(3-hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone, or a pharmaceutically acceptable salt thereof.

22. The method according to claim 10, wherein the compound is(S)-(3-hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone, or a pharmaceutically acceptable salt thereof.

23. The method according to claim 13, wherein the compound is(S)-(3-hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone, or a pharmaceutically acceptable salt thereof.

24. The method according to claim 14, wherein the compound is(S)-(3-hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone, or a pharmaceutically acceptable salt thereof.

25. The method according to claim 15, wherein the compound is(S)-(3-hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone, or a pharmaceutically acceptable salt thereof.

26. The method according to claim 16, wherein the compound is(S)-(3-hydroxypyrrolidin-1-yl)(1-methyl-5-(4-(5-(trifluoromethyl)-1,2,4-oxadiazol-3-yl)pyridin-2-yl)-1H-pyrrolo[2,3-c]pyridin-2-yl)methanone, or a pharmaceutically acceptable salt thereof.

27. The method according to claim 10, wherein the compound is N,1-dimethyl-N-((1-methylpiperidin-4-yl)methyl)-5-(4-(5-(trifluoromethyl)-1,2,4-oxadiazol-3-yl)pyridin-2-yl)-1H-pyrrolo[2,3-c]pyridine-2-carboxamide, or a pharmaceutically acceptable salt thereof.

28. The method according to claim 13, wherein the compound is N,1-dimethyl-N-((1-methylpiperidin-4-yl)methyl)-5-(4-(5-(trifluoromethyl)-1,2,4-oxadiazol-3-yl)pyridin-2-yl)-1H-pyrrolo[2,3-c]pyridine-2-carboxamide, or a pharmaceutically acceptable salt thereof.

29. The method according to claim 14, wherein the compound is N,1-dimethyl-N-((1-methylpiperidin-4-yl)methyl)-5-(4-(5-(trifluoromethyl)-1,2,4-oxadiazol-3-yl)

pyridin-2-yl)-1H-pyrrolo[2,3-c]pyridine-2-carboxamide, or a pharmaceutically acceptable salt thereof.

30. The method according to claim 15, wherein the compound is N,1-dimethyl-N-((1-methylpiperidin-4-yl)methyl)-5-(4-(5-(trifluoromethyl)-1,2,4-oxadiazol-3-yl)pyridin-2-yl)-1H-pyrrolo[2,3-c]pyridine-2-carboxamide, or a pharmaceutically acceptable salt thereof.

31. The method according to claim 16, wherein the compound is N,1-dimethyl-N-((1-methylpiperidin-4-yl)methyl)-5-(4-(5-(trifluoromethyl)-1,2,4-oxadiazol-3-yl)pyridin-2-yl)-1H-pyrrolo[2,3-c]pyridine-2-carboxamide, or a pharmaceutically acceptable salt thereof.

32. The method according to claim 10, wherein the compound is N-(cyclopropylmethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide, or a pharmaceutically acceptable salt thereof.

33. The method according to claim 13, wherein the compound is N-(cyclopropylmethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide, or a pharmaceutically acceptable salt thereof.

34. The method according to claim 14, wherein the compound is N-(cyclopropylmethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide, or a pharmaceutically acceptable salt thereof.

35. The method according to claim 15, wherein the compound is N-(cyclopropylmethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide, or a pharmaceutically acceptable salt thereof.

36. The method according to claim 16, wherein the compound is N-(cyclopropylmethyl)-N,1-dimethyl-5-(4-(5-(trifluoromethyl)-1,2,4-oxadiazol-3-yl)pyridin-2-yl)-1H-pyrrolo[2,3-c]pyridine-2-carboxamide, or a pharmaceutically acceptable salt thereof.

\* \* \* \* \*